United States Patent
Camilleri et al.

(10) Patent No.: US 12,072,967 B2
(45) Date of Patent: *Aug. 27, 2024

(54) DEVICE IDENTIFICATION WITH QUANTUM TUNNELLING CURRENTS

(71) Applicant: Crypto Quantique Limited, London (GB)

(72) Inventors: Patrick Camilleri, London (GB); Shahram Mossayebi, London (GB); Faisal Awqati, London (GB)

(73) Assignee: Crypto Quantique Limited, London (GB)

( * ) Notice: Subject to any disclaimer, the term of this patent is extended or adjusted under 35 U.S.C. 154(b) by 166 days.

This patent is subject to a terminal disclaimer.

(21) Appl. No.: 17/602,375

(22) PCT Filed: Apr. 8, 2020

(86) PCT No.: PCT/GB2020/050918
§ 371 (c)(1),
(2) Date: Oct. 8, 2021

(87) PCT Pub. No.: WO2020/212689
PCT Pub. Date: Oct. 22, 2020

(65) Prior Publication Data
US 2022/0164433 A1 May 26, 2022

(30) Foreign Application Priority Data
Apr. 17, 2019 (GB) ...................... 1905446

(51) Int. Cl.
*G06F 21/44* (2013.01)
*G06N 10/00* (2022.01)
*H04L 9/32* (2006.01)

(52) U.S. Cl.
CPC ............. *G06F 21/44* (2013.01); *G06N 10/00* (2019.01); *H04L 9/3278* (2013.01)

(58) Field of Classification Search
CPC ....... G06F 21/44; G06N 10/00; H04L 9/3278; H04L 2209/12; H04L 9/0866; H04L 9/0852; G09C 1/00; H03K 17/06
See application file for complete search history.

(56) References Cited

U.S. PATENT DOCUMENTS 10,056,905 B1    8/2018 Bowers et al.
10,164,640 B1 *  12/2018 Lu ..................... G11C 16/045
(Continued)

FOREIGN PATENT DOCUMENTS

GB    2554717 A    4/2018
GB    2573308 A    11/2019
(Continued)

OTHER PUBLICATIONS

Roberts et al., "UsingQuantumConfinementtoUniquelyIdentifyDevices", ScientificReports, Nov. 10, 2015;5:1-8 (Year: 2015).*
(Continued)

*Primary Examiner* — Harunur Rashid
(74) *Attorney, Agent, or Firm* — Wolf, Greenfield & Sacks, P.C.

(57) ABSTRACT

A method is disclosed for determining an identifier value of a device, the device comprising an array of individually addressable cells, each cell comprising an electronic component having a quantum tunnelling barrier. The method comprises, for each cell of a selection of the individually addressable cells of the array, applying a potential difference across the electronic component of the cell, the potential difference sufficient to enable tunnelling of charge carriers through the quantum tunnelling barrier. The method further comprises, for each cell of a selection of the individually addressable cells of the array, comparing an electrical signal representative of a quantum tunnelling current through the quantum tunnelling barrier with a reference electrical signal. The method further comprises, for each cell of a selection of (Continued)

the individually addressable cells of the array determining, from the comparison, an identifier value for the cell. The method further comprises determining, from the identifier values of each cell of the selection of individually addressable cells, an identifier value for the device. Devices, apparatuses, controllers, and computer-readable media are also described.

20 Claims, 10 Drawing Sheets

(56) References Cited

U.S. PATENT DOCUMENTS

| | | | |
|---|---|---|---|
| 2017/0338819 | A1 | 11/2017 | Wacquez et al. |
| 2018/0286486 | A1* | 10/2018 | Tiwari ................ G06F 21/73 |

FOREIGN PATENT DOCUMENTS

| | | |
|---|---|---|
| JP | 2017-041295 A | 2/2017 |
| JP | 2017-216030 A | 12/2017 |
| JP | 2018-113415 A | 7/2018 |
| JP | 2017-216031 A | 12/2021 |
| KR | 0185214 B1 | 4/1999 |
| WO | WO 2018/065770 A1 | 4/2018 |

OTHER PUBLICATIONS

Combined Search and Examination Report for United Kingdom Application No. GB1905446.9 dated Oct. 21, 2019.
International Search Report and Written Opinion for International Application No. PCT/GB2020/050918 dated Jun. 17, 2020.
Roberts et al., Using quantum confinement to uniquely identify devices. Scientific reports. Nov. 10, 2015;5(1):1-8.
JP 2021-561724, May 7, 2024, Japanese Office Action.
KR 10-2021-7035636, Apr. 29, 2024, Korean Office Action.
Japanese Office Action dated May 7, 2024, in connection with Japanese Application No. 2021-561724, with English Translation thereof.
Korean Office Action dated Apr. 29, 2024, in connection with Korean Application No. 10-2021-7035636, with English Translation thereof.
Chen, Comprehensive Assessment of RRAM-based PUF for Hardware Security Applications, 2015 IEEE International Electron Devices Meeting (IEDM), U.S., IEEE, Dec. 7, 2015, pp. 10.7.1-10.7.4.

* cited by examiner

DEVICE IDENTIFICATION WITH QUANTUM TUNNELLING CURRENTS

RELATED APPLICATIONS

This Application is a national stage filing under 35 U.S.C. 371 of International Patent Application Serial No. PCT/GB2020/050918, filed Apr. 8, 2020, which claims the benefit of British application number 1905446.9, filed Apr. 17, 2019, each of which is herein incorporated by reference in its entirety.

TECHNICAL FIELD

The present invention relates generally to the determination or generation of an identifier value for a device. In particular, the present disclosure relates to the determination or generation of an identifier value for a device by utilising a quantum tunnelling effect.

BACKGROUND

Networks such as the Internet have changed the way that everyday tasks are carried out, and this has had major implications for information security. Many everyday tasks require digital devices to securely authenticate and be authenticated by another party and/or securely handle private information. In a world in which an identifier is physically available to the authenticator this is a trivial issue—for example a bank teller may be able to authenticate a bank customer in a bank branch by checking the customer's passport or other identifying documents. However, the situation is far more complicated if the customer's identifying documents are not immediately available, for example when a customer is provided with an online banking service. The bank must ensure that the correct customer is given access to the correct resources and information. But how can the bank secure the communication link to the customer across a network to prevent eavesdropping or tampering with data, and how can the customer be certain that he or she is connected to their banking service and not an impersonator?

There are many cryptographic applications that may be employed to address such issues, for example digital signatures or other secret cryptographic keys. In order to provide a secure memory or authentication source, one commonplace method is to place a cryptographic key in a non-volatile electrically erasable programmable read-only memory (EEPROM) or battery backed static random access memory (SRAM) and to use cryptographic operations such as digital signatures or encryption. However, such approaches are often time consuming and can be costly in terms of power consumption. In addition, non-volatile memory is often vulnerable to invasive attacks in which the cryptographic key can be taken. If a stolen cryptographic key is used by a third party in, for example, a bank transaction, the bank would have no immediate way of knowing that the key was being fraudulently used by the third party and so may allow such a fraudulent transaction to proceed.

Accordingly, it is desirable to be able to uniquely identify a device/apparatus associated with a user such that, without the device/apparatus, certain operations or transactions may not proceed. That is, it is desirable to be able to "fingerprint" a device. Such a fingerprint or identifier must be difficult to clone and largely invariant to environmental factors so that whenever the identity of the device is queried a robust and faithful answer is returned.

Physically unclonable functions (also known as physical unclonable functions or PUFs) are a cryptographic primitive that are used for authentication and secret key storage without the requirement of secure EEPROMs and other expensive hardware. Instead of storing secrets in digital memory, PUFs derive a secret from the unique physical characteristics of a device, usually introduced during manufacture. Known PUFs are provided on the basis of what would commonly be considered to be classical or macroscopic physics, such as the scattering of laser light through a sheet of hardened epoxy in which tiny silica spheres are suspended, or manufacturing variability in gate delay in some circuits. However, as technology progresses there is a need for ever smaller devices, and PUFs based on such designs are difficult to scale down.

It is an object of embodiments of the invention to at least mitigate one or more of the problems of the prior art.

SUMMARY

According to an aspect of the invention a method is provided for determining an identifier value of a device. The device comprises one or more arrays of individually addressable cells, each cell comprising an electronic component having a quantum tunnelling barrier. The method comprises, for each cell of a selection of the individually addressable cells of the one or more arrays, applying a potential difference across the electronic component of the cell, the potential difference sufficient to enable tunnelling of charge carriers through the quantum tunnelling barrier. The method further comprises, for each cell of the selection of the individually addressable cells of the one or more arrays, comparing an electrical signal representative of a quantum tunnelling current through the quantum tunnelling barrier with a reference electrical signal. The method further comprises, for each cell of the selection of the individually addressable cells of the array, determining, from the comparison, an identifier value for the cell. The method further comprises determining, from the identifier values of each cell of the selection of individually addressable cells, an identifier value for the device.

A method for determining an identifier value for a device as described herein advantageously allows for security issues such as verification to be addressed even as devices are scaled down in size. Counter-intuitively, the quantum tunnelling effect, which is often seen as a source of loss or noise in a system or component, is instead used to the advantageous effect of allowing a device to be identified. Furthermore, the methods and devices described herein are largely invariant to environmental effects such as temperature change and so can be reliably used to identify a device.

Additionally, the nanoscale, molecular, or atomic scale structure of a quantum tunnelling barrier is very difficult to tamper with and so the use of a quantum tunnelling current to derive an identifier value for a device allows for reliable device authentication. In contrast, other (classical) PUFs, such as an SRAM-PUF, can be tampered with by for example shining light on cells of the SRAM-PUF. Quantum tunnelling is extremely sensitive to the nanostructure of atomic layers (of tunnelling barriers). These nanostructure are unique and random due to inherently random nature of the atomic positions and imperfections. Simulating these structures requires vast computing power and is not achievable on a reasonable timescale, even with a modest quantum computer. This makes the output of arrays quantum-safe.

The array may be of any suitable size and shape. The term "array" may be taken to mean an arrangement/collection/plurality of individually addressable cells. A cell may be an addressable unit of any array, and may or may not be understood to mean a minimal addressable unit of the array. The term "cell" is accordingly intended to be interpreted broadly, and may be taken to mean one or more elementary circuits. An elementary circuit may be taken to mean a circuit comprising the minimum circuitry necessary to produce a quantum tunnelling current, and in particular an electronic component with a quantum tunnelling barrier. That is, a cell may comprise multiple elementary circuits (minimal addressable units) and thereby comprise multiple electronic components. When a cell is addressed, the number of elementary circuits addressed is equal to the number of elementary circuits comprised in the cell. For example, an array may comprise rows and columns of elementary circuits and a cell may comprise an entire row/column of the elementary circuits. Furthermore, a first cell may comprise a first set of one or more elementary circuits, and a second cell may comprise a second set of one or more elementary circuits, and in some examples the first set and second set may partially overlap. Accordingly, within an array, there may be many more possible combinations of cells in the array than there are elementary circuits.

A selection of cells may be any combination of one or more cells. For example, a selection of cells of the array may comprise a selection of a single cell of the array, or a plurality of cells of the array, or in some circumstances may be the entire array of individually addressable cells. The selection of cells may be an ordered selection of cells—that is, the selection of cells may comprise an indication of the order in which cells of the array are to be interrogated/probed.

The electronic component of a cell may include a single/only one/fewer than two quantum tunnelling barriers. That is the potential difference may be applied across only a single quantum tunnelling barrier to produce a tunnelling current through the quantum tunnelling barrier of the component, and so there may be no quantum confinement in the component. Accordingly, an identifier value for each cell may be determined that is not dependent on a quantum confinement effect in the cell. As explained above, a cell may comprise multiple elementary circuits, each having an electronic component with a single quantum tunnelling barrier such that any identifier values are not dependent on quantum confinement effects.

The electronic component of each cell may comprise a transistor. A transistor may comprise a source terminal, a drain terminal and a gate terminal, the gate terminal separated from the source terminal and the drain terminal by a quantum tunnelling barrier unique to the transistor (i.e. the insulating oxide layer between the gate terminal and the channel of the transistor). A potential difference between the source terminal and the drain terminal may be substantially zero. A potential difference may be applied between the gate terminal and at least one of the source terminal and the drain terminal, the potential difference sufficient to enable tunnelling of charge carriers through the quantum tunnelling barrier. The resultant gate leakage current may comprise a quantum tunnelling current. The tunnelling current may further be characteristic of a semiconductor channel between the source terminal and the drain terminal. The gate leakage signal may therefore be characteristic of the nanoscale properties of the channel, for example a random dopant distribution in the channel.

The electronic component may comprise a floating gate transistor. The electronic device may comprise a quantum dot transistor.

The electronic component of each cell may comprise a capacitor. The quantum tunnelling barrier may comprise a dielectric layer between two terminals of the capacitor.

The charge carriers may be electrons. The charge carriers may be quasiparticles such as holes.

The quantum tunnelling barrier may have an average thickness of less than or equal to five nanometres. For example, the quantum tunnelling barrier may have an average thickness of less than or equal to three nanometres.

The quantum tunnelling current may comprise a leakage current, for example a gate leakage current.

An electrical signal representative of a quantum tunnelling current may comprise the quantum tunnelling current itself. The electrical signal may comprise an amplified current, or an amplified voltage. The electrical signal may comprise any suitable signal representative of the quantum tunnelling current.

If the electrical signal is greater than the reference electrical signal then the identifier value for the cell may be determined to be a first bit value. If the electrical signal is less than the reference electrical signal then the identifier value for the cell may be determined to be a second bit value different to the first bit value. For example, the first bit value may be a zero and the second bit value may be a 1. The first bit value may be a 1 and the second bit value may be a zero. The condition may be further refined. For example, if the electrical signal is greater than or equal to the reference electrical signal then the identifier value for the cell may be determined to be a first bit value, or alternatively, if the electrical signal is less than or equal to the reference electrical signal then the identifier value for the cell may be determined to be a second bit value. Of course, the identifier value for the cell may take any suitable form, for example a current or voltage value.

The electronic component having a first quantum tunnelling barrier may be a first electronic component having a first quantum tunnelling barrier. Each cell may further comprise a second electronic component having a second quantum tunnelling barrier. The method may further comprise, for each cell of the selection of the individually addressable cells of the array, applying a potential difference across the second electronic component of the cell, the potential difference sufficient to enable tunnelling of charge carriers through the quantum tunnelling barrier. Comparing an electrical signal representative of a quantum tunnelling current through the quantum tunnelling barrier with a reference electrical signal may comprise comparing a first electrical signal representative of a first quantum tunnelling current through the first quantum tunnelling barrier with a second electrical signal representative of a second quantum tunnelling current through the second quantum tunnelling barrier. The second electronic component may comprise a transistor or a capacitor. Advantageously, each cell comprises two electronic components with which to compare one another, and so an identifier value for each cell can be established without reference to any other cells/signals and so on.

Comparing an electrical signal representative of a quantum tunnelling current through the quantum tunnelling barrier with a reference electrical signal may comprise comparing the electrical signal with a second electrical signal representative of a second quantum tunnelling current through a second quantum tunnelling barrier of a second electronic component of a second cell of the array. The second electronic component may comprise a transistor or a capacitor. The reference electrical signal may therefore be extracted from another cell of the array.

In other examples, the reference electrical signal may be generated by some feature of the device external to the array i.e. the electrical signal representative of a quantum tunnelling current is, for each cell, compared to a common reference signal. Advantageously, this requires fewer components in each cell of the array.

The method may further comprise producing an amplified voltage from the quantum tunnelling current, and the electrical signal representative of the quantum tunnelling current may comprise the amplified voltage.

The method may further comprise selecting the selection of the individually addressable cells.

Determining an identifier value for the device may comprise generating a unique identifier value for the device (for a given selection of cells). For example, an enroller may generate an identifier value for the device for storing. An enroller may, for example, generate a first identifier value for the device based on a first selection of the cells of the array, and store an indication of that first selection of cells and the first identifier value in memory. The enroller then may generate further identifier values for the device based on further selections of the cells of the array, and store further indications of the further selections of cells in memory. In this way, the enroller may build up a database of possible combinations of cells and corresponding identifier values.

Determining an identifier value for the device may comprise verifying an identifier value for the device. For example, an authenticator may determine the identifier value for the device in order to verify the device, by for example consulting a stored or otherwise accessible database of possible combinations of cells and corresponding identifier values. By probing the device with one or more selected combinations of the cells of the array and comparing the resultant identifier values with known values, the authenticator may authenticate the device.

The method may further comprise comparing the determined identifier value of the device with a known identifier corresponding to a selection of individually addressable cells of an array. In this way, an authenticator may be able to determine whether a device with which the authenticator is in communication has access to a particular array, more specifically the array to which the known identifier corresponds. Accordingly, an authenticator is able to authenticate a device.

The identifier value for the device may be determined in any suitable way. For example, the identifier value for the device may comprise a concatenation of the identifier values determined for the selection of cells. The identifier value for the device may comprise a bit string of binary digits. In other examples, the identifier values for the cells may be taken as an input to a function, and possibly a non-linear function. The function may comprise a cryptographic hash function. The function may comprise a cryptographic key derivation function. The function may comprise a cryptographic key generator function. The function may comprise a pseudo random permutation. The function may comprise a pseudo random function.

The device identifier value may be determined from cell identifier values of several arrays.

The device identifier may additionally be dependent on other features unrelated to the array.

The identifier value for the device can be used as input to a symmetric stream cipher key generator, or a block cipher. The identifier value for the device can be used to generate a public key and a private key of an asymmetric public/private key pair. The identifier value for the device may be used to generate a public key and a private key of an asymmetric public/private key pair that is post-quantum secure (quantum-safe)—that is, secure against an attack by a quantum computer. The identifier value for the device may be used to generated cryptographic keys for post-quantum (quantum-safe) symmetric and asymmetric cryptographic systems.

The identifier value for the device may be used in distributed protocols such as a blockchain protocol (for example, a cryptocurrency) for their key pair and identity generation.

The method may further comprise providing the identifier value for the device for use in a communication protocol or a data transaction. The identifier value for the device may be used in encrypting or authenticating an aspect of the communication protocol or data transaction. The method may further comprise providing the identifier value for the device as a digital identifier of a physical object or a digital object. The method may comprise using the identifier vale in a communication protocol or a data transaction and/or using the unique identifier as a digital identifier of a physical object or a digital object.

The device may comprise an integrated circuit or microchip. The device may comprise a complementary metal-oxide-semiconductor, CMOS, chip. The device may be an internet-of-things device. The device may be for use in secure communication, for example over the Internet.

According to an aspect of the invention, a computer readable medium is provided. The computer readable medium has instructions stored thereon which, when executed by a processor, cause the processor to implement a method as described herein. The computer-readable medium may be a non-transitory computer-readable medium.

According to an aspect of the invention, a computer readable storage medium is provided, the computer readable storage medium configured to store challenges and responses pertaining to an array, the array comprising a plurality of individually addressable cells, each cell of the array comprising an electronic component having a quantum tunnelling barrier. The computer readable storage medium comprises/contains at least first information interpretable as a selection of cells of the array. The computer readable storage medium comprises/contains at least second information interpretable as an identifier value of the array. The identifier value of the array is associated with the selection of cells of the array. The identifier value for the array is determinable from the selection of cells of the array by performing a method as described herein.

The computer program and/or the code for performing such methods as described herein may be provided to an apparatus, such as a computer, on the computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

According to an aspect of the invention, a controller is provided. The controller is configured to determine an identifier of a remote device by performing a method as described herein. The controller comprises one or more processors configured to communicate with the remote device to cause the performance of a method as described herein. In particular, the controller may send and receive communications which cause a remote device to interrogate an array.

The controller may be considered as an enroller/enrolment device, configured to determine and store a several challenges and associated responses. A challenge may comprise any information interpretable as a selection of cells of an array to be interrogated. A response may comprise any information interpretable as an identifier value of a device under interrogation.

The controller may be considered as an authenticator/authentication device, configured to send a challenge (information indicative of a selection of array cells) to a device having an array and to receive a response. The controller may be configured to process the received response to determine a received identifier value. The controller may be configured to compare the received identifier value with a stored expected value associated with the challenge. The controller may be configured to determine from the comparison whether the device does has successfully answered the challenge, and may thereafter determine that the device does have access to the particular array with which the expected value is associated. According to an aspect of the invention, a device is provided. The device comprises an array of individually addressable cells, each cell comprising an electronic component having a quantum tunnelling barrier. The device further comprises processing means in the form of processing circuitry. The processing circuitry is configured to, for each cell of a selection of the individually addressable cells of the array, apply a potential difference across the electronic component of the cell, the potential difference sufficient to enable tunnelling of charge carriers through the quantum tunnelling barrier. The processing circuitry is configured to, for each cell of a selection of the individually addressable cells of the array, compare an electrical signal representative of a quantum tunnelling current through the quantum tunnelling barrier with a reference electrical signal. The processing circuitry is configured to, for each cell of a selection of the individually addressable cells of the array, determine, from the comparison, an identifier value for the cell. The processing circuitry is further configured to determine, from the identifier values of each cell of the selection of individually addressable cells, an identifier value for the device.

The electronic component having a quantum tunnelling barrier may be a first electronic component having a first quantum tunnelling barrier. Each cell may further comprise a second electronic component having a second quantum tunnelling barrier. The processing circuitry may be further configured to, for each cell of the selection of the individually addressable cells, apply a potential difference across the second electronic component of the cell, the potential difference sufficient to enable tunnelling of charge carriers through the second quantum tunnelling barrier. Comparing an electrical signal representative of a quantum tunnelling current through the quantum tunnelling barrier with a reference electrical signal may comprises comparing a first electrical signal representative of a first quantum tunnelling current through the first quantum tunnelling barrier with a second electrical signal representative of a second quantum tunnelling current through the second quantum tunnelling barrier.

The processing circuitry may include a latched comparator configured to, for each cell of the selection of the individually addressable cells of the array, compare the electrical signal representative of the tunnelling current through the quantum tunnelling barrier with the reference electrical signal.

The processing means may include a transimpedance amplifier configured to, for each cell of the selection of the individually addressable cells of the array, produce an amplified voltage from the quantum tunnelling current, wherein the electrical signal representative of the quantum tunnelling current comprises the amplified voltage. The transimpedance amplifier may be further configured to apply the potential difference across the electronic component of the cell.

The device may further comprise a communication module configured to receive a communication from a third party, the communication indicating the selection of the individually addressable cells of the array. The communication module may be configured to transmit a second communication indicating the indicating the identifier value of the device. For example, the communication module may communicate the identifier value to an authenticator such as a controller described herein.

The processing circuitry may comprise one or more processors configured to select the selection of individually addressable cells of the array. The processing circuitry may comprise one or more processors configured to determine the identifier values for each cell of the selection of individually addressable cells of the array. The processing circuitry may comprise one or more processors configured to determine, from the identifiers of each cell of the selection of individually addressable cells, the identifier value for the device. The device may be an internet-of-things device. The device may be for use in secure communication, for example over the Internet.

The array may be a physically unclonable function. In particular, each cell of the array comprises one or more components having a quantum tunnelling barrier and, as will be described herein, a quantum tunnelling current through the quantum tunnelling barrier is characteristic of that quantum tunnelling barrier, and the quantum tunnelling barrier of the electronic component may be physically unclonable. Characteristics of the quantum tunnelling barrier revealed by the quantum tunnelling current may result from one or more distinctive nanoscale properties of the component that arise from component-to-component variability between ostensibly identical components produced by the same semiconductor manufacturing process. The distinctive nanoscale properties that are variable from component-to-component may be beyond the control of a semiconductor manufacturing process used to produce the component. Accordingly, it is difficult to clone the array such that the same identifier values are achievable.

According to an aspect of the invention, a wafer or substrate is provided. The wafer comprises a plurality of arrays as described herein, wherein each array comprises a plurality of individually addressable cells, each cell comprising an electronic component having a quantum tunnelling barrier unique to that component.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE FIGURES

Embodiments of the invention will now be described by way of example only, with reference to the accompanying figures, in which.

Throughout the description and the drawings, like reference numerals refer to like parts.

DETAILED DESCRIPTION

Figure 1:
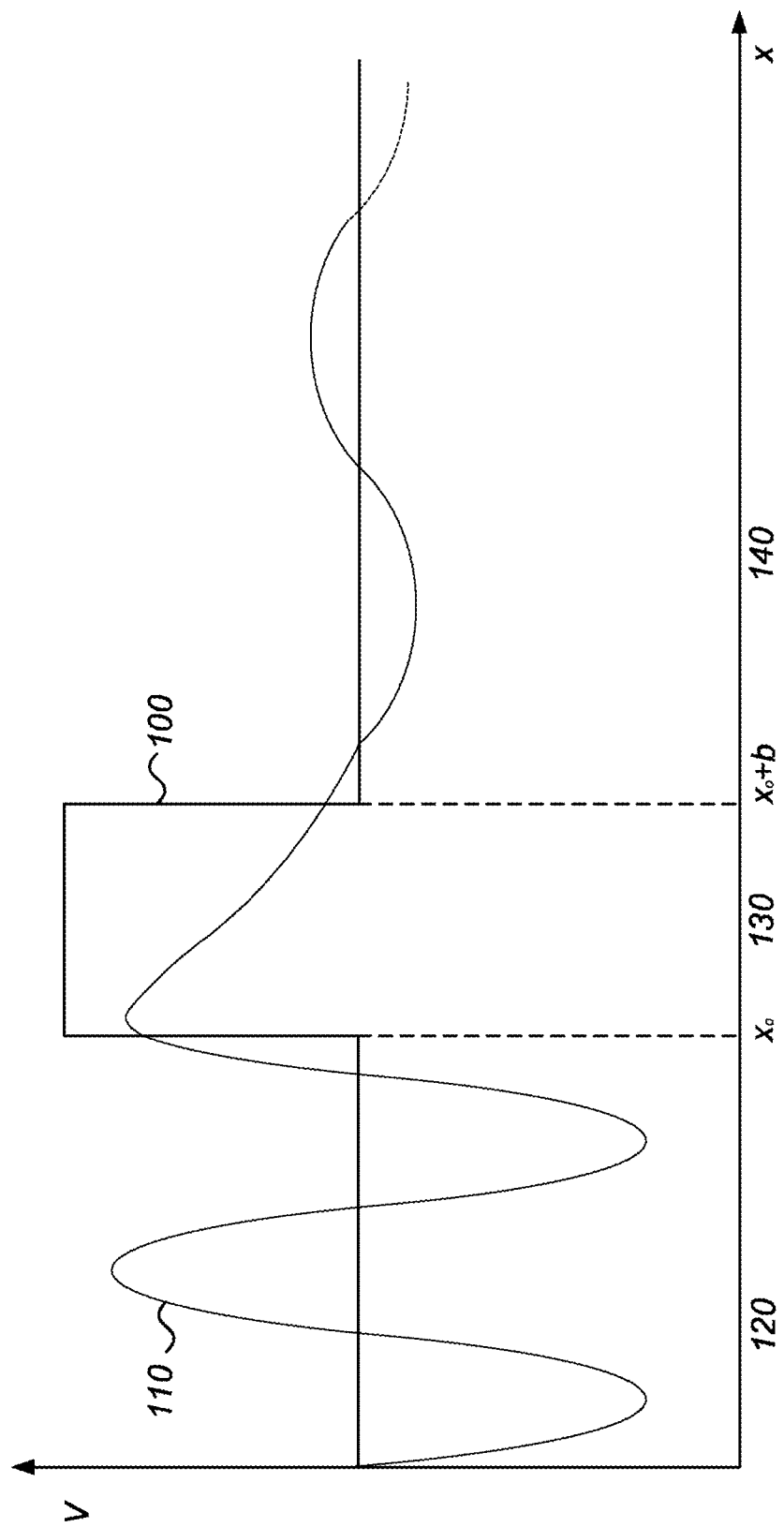
FIG. 1 illustrates a one dimensional wavefunction of a particle tunnelling through a quantum tunnelling barrier.

The present invention seeks to provide novel/improved methods for determining an identifier value of a device, and appropriate apparatuses and devices for performing said methods. Whilst various embodiments are described below, the invention is not limited to these embodiments, and variations of these embodiments may well fall within the scope of the invention which is to be limited only by the appended claims.

In what follows, the terms physically unclonable function, physical unclonable function, and PUF are used interchangeably. A PUF comprises an object that performs a functional operation, i.e. when queried with a certain input a PUF produces a measurable output. A PUF is not a true function in the mathematical sense, as an input to a PUF may have more than one possible output. Typically, an input to a PUF is referred to as a "challenge" and the resultant output of the PUF is referred to as a "response". An applied challenge and its measured response is known as a "challenge-response pair" or "CRP". In a typical application scenario, often referred to as "enrolment", one or more challenge-response pairs are gathered from a particular PUF and stored in a corresponding database. In another typical application scenario, often referred to as "verification" or "authentication", a challenge from the database is applied to the PUF and the response produced by the PUF is compared with the corresponding response from the database. A PUF that can only be interrogated by one or a small number of challenges may sometimes be referred to as a "Physically Obfuscated Key" or "POK".

A PUF should be largely invariant to environmental conditions such that its response to any given challenge can be predicted by a valid authenticator having knowledge of a corresponding CRP. This idea is largely captured by the concept of an "intra-distance" between two evaluations on one single PUF instantiation, which is the distance between the two responses resulting from applying a particular challenge twice to the same PUF. One instantiation of a PUF should also be clearly differentiable from another. For a particular challenge, the "inter-distance" between two PUF instantiations is the distance between the two responses resulting from applying the challenge once to both PUF instantiations. The distance measure used can vary depending on the nature of the response—for example, when the response is a bit string, the Hamming distance may be used. Desirably, PUFs should have small intra-distances and large inter-distances.

In relation to integrated circuits (ICs), a PUF is a pseudorandom function that exploits the random disorders in the integrated circuits' (complementary metal-oxide-semiconductor—"CMOS") fabrication process to generate random and unique identifiers by physically reducing the IC's microstructure to a fixed-length string.

To achieve higher integration density and performance, CMOS devices and their components have been scaled downwards in size in recent years, to the extent that quantum mechanical effects are becoming more important to the operation of such devices/components. For example, due to this scaling down, current may flow through one or more components of a device even when the device is considered to be in an "off" state in which current should not classically be able to flow. Such quantum mechanical effects, including leakage currents, are usually considered as losses in such systems, for example a leakage current in a transistor is often seen as a limitation on the control over that transistor. Accordingly, as CMOS devices and ICs have become smaller and smaller, there has been a tendency to try to mitigate, correct for, or eliminate such seemingly detrimental effects.

The inventors have recognised that, contrary to such quantum mechanical effects being considered as a loss or source of noise, quantum mechanical effects, and in particular quantum tunnelling, in components such as CMOS components may be utilised as a useful cryptographic primitive. In particular, such quantum mechanical effects are based on the nanoscale or atomic scale properties of the underlying component and the inventors have further recognised that, as such, these quantum mechanical effects may be used to uniquely identify the underlying component. That is, such quantum mechanical signatures may be used to describe a physically unclonable function or physically obfuscated key.

The inventors have, in particular, recognised that a quantum tunnelling current through a quantum tunnelling barrier uniquely characterises the quantum tunnelling barrier itself and is, unlike in devices which utilise quantum confinement, largely invariant to environmental effects and in particular external temperature. The methods and devices disclosed herein are therefore able to provide a robust identifier value or signature value for identifying a device. Accordingly, the inventors have recognised that by analysing quantum tunnelling currents, one may implement a PUF or POK.

The principle underlying the methods described herein will now be described with reference to FIG. 1, which demonstrates the effect of an energy potential V provided by a quantum tunnelling barrier 100 on a particle's wavefunction 110.

In the macroscopic world, when an object hits an obstacle its path is blocked unless it has enough energy to pass through the obstacle. In the microscopic world, however, it is possible for an object to pass through an obstacle or barrier even though the object does not have the classically required energy. Quantum mechanics can tell us with what probability an object may be found on the far side of an obstacle that it classically should not be able to pass through. The process by which this occurs is a random process known as quantum tunnelling.

If a charged particle, such as an electron, moves through a barrier that it classically should not be able to pass through, this movement of charge gives rise to a tunnelling current. Electrons have wavelike properties and can be described by a wavefunction 110, which in the example shown in FIG. 1 is a one-dimensional wavefunction $\psi(x)$.

In region 120 of FIG. 1 ($x<x_0$), the energy E of an electron is greater than the potential energy $V(x)$ of its surroundings (i.e. the electron is free to travel as there is no quantum tunnelling barrier in this region) and accordingly in the figure the wavefunction 110 has a first form.

In region 130 of FIG. 1, between $x_0$ (the position at which a classical particle would be reflected) and $x_0+b$, where b is the thickness of a quantum tunnelling barrier 100, the energy E of an electron is less than the energy $V(x)$ of the barrier.

The transmission amplitude provided by the wavefunction 110 during tunnelling is proportional to:

$$\exp\left[-\frac{1}{\hbar}\int_{x_0}^{x}\sqrt{2m(V(x)-E)}\,dx\right]$$

where $x_0$ is the classical turning point, m is the mass of the particle, and $\hbar=h/2\pi$ where h is Planck's constant. The probability of finding the particle on the other side of the barrier (region 140 in which the energy E of an electron is again greater than the potential energy $V(x)$) is proportional to the square of this amplitude:

$$\exp\left[-\frac{2}{\hbar}\int_{x_0}^{x+b}\sqrt{2m(V(x)-E)}\,dx\right]$$

where b is the width of the barrier 100. Because of the sharp decay of the probability function through the barrier, the number of electrons that will actually be found to have tunneled through the barrier is dependent upon the thickness or width of the barrier 100.

In practice, the quantum tunnelling barrier 100 may take any suitable form so long as the barrier has a spatial dimension at or below a length scale corresponding to the de Broglie wavelength of the particle of interest. For example, the barrier 100 may comprise a nanoscale dielectric, air, vacuum or other media. Further examples will be provided below.

As will be appreciated by the skilled person, the potential barrier 100 of FIG. 1 is presented in a simplified form as a one dimensional potential barrier, for which the potential $V(x)$ is a constant across its width. However, in practice even in the one-dimensional case, nanoscale or atomic scale structural features of the barrier, for example impurities in a dielectric from which the barrier is formed, will give rise to variations in the potential $V(x)$ across its width, which in turn leads to a barrier-specific decay in the transmission amplitude of a particle such as an electron across the barrier. This in turn means that the tunnelling current resulting from tunnelling through the barrier is also affected by the intrinsic features of the barrier 100. Accordingly, a measured tunnelling current may be used to uniquely identify a quantum tunnelling barrier and any device in which such a quantum tunnelling barrier is located. The skilled person would appreciate that the same considerations also apply to higher dimensional barriers, such as two-dimensional barriers, or three-dimensional barriers (for which the potentials can be described by multivariate functions $V(x,y)$ and $V(x,y,z)$ respectively).

As explained above, a PUF exploits the unique physical properties of a device which are usually introduced during manufacturing processes. Sources of variations between such devices will be explained further below in relation to CMOS components and, in particular, to metal-oxide-semiconductor field-effect transistors (MOSFETs) or metal-insulator-semiconductor field-effect transistors (MISFETs), although the skilled person will appreciate that these sources of variation are also relevant to other structures and electronic components.

Figure 2:
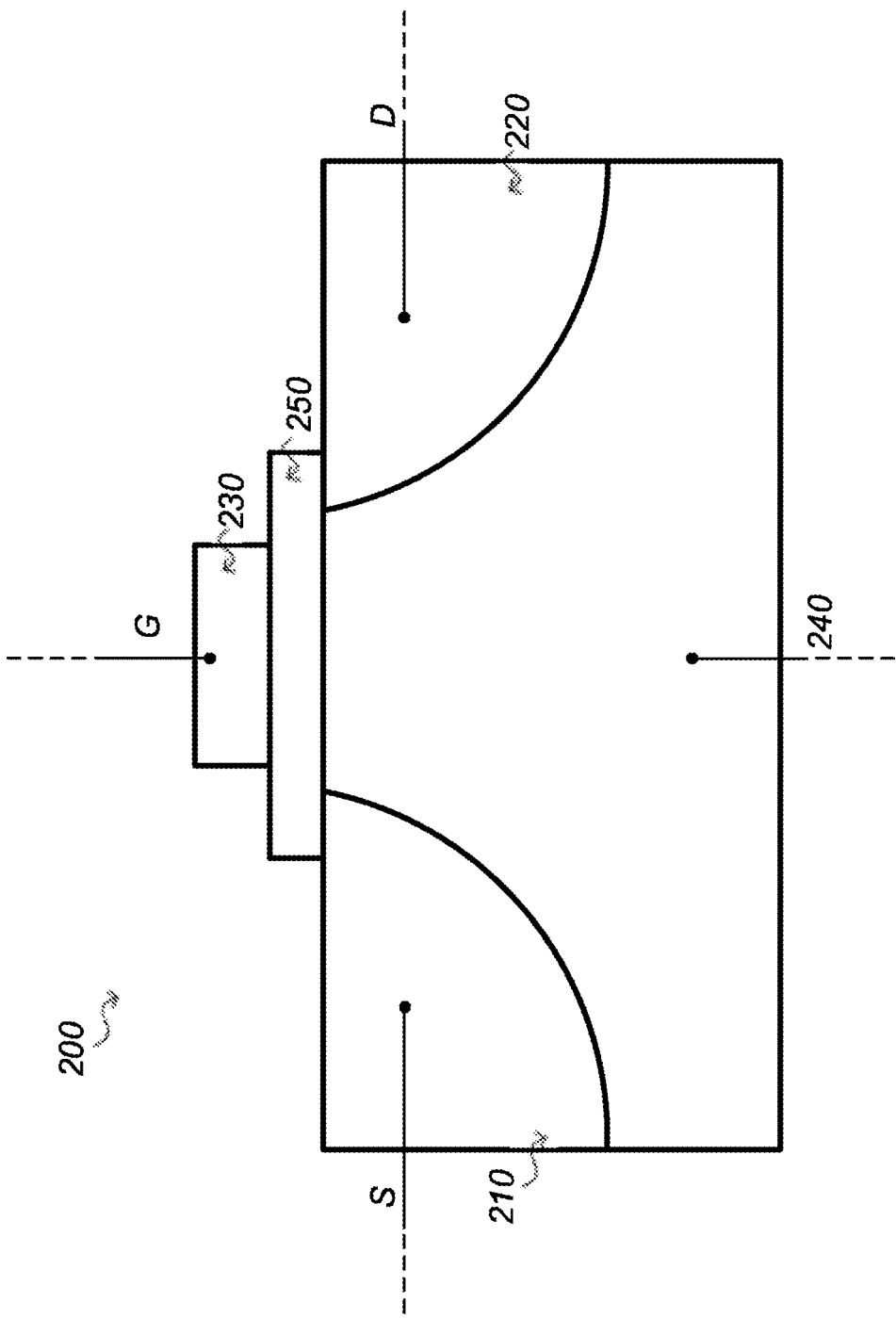
FIG. 2 shows a schematic of a transistor component.

FIG. 2 is a schematic of an electronic component and in particular a transistor component 200 such as a MOSFET or MISFET. The component 200 comprises a source terminal 210, a drain terminal 220, a gate terminal 230, and a body 240. The gate terminal 230 is separated from the source terminal 210 and the drain terminal 220 by an insulating layer 250. The transistor component 200 is small such that the insulating layer 250 has a nanoscale thickness such that it acts as a quantum tunnelling barrier 200.

The transistor component 200 has an electronically variable width of a channel along which charge carriers (electrons or holes) flow between the source terminal and drain terminal. The width of the channel is controlled by the voltage on the gate terminal 230 which is located between source 210 and drain 220.

As has been mentioned above, as components such as transistor 200 are made smaller, insulating layers such as insulating layer 250 are made thinner until at the nanoscale, quantum tunnelling of charge carriers through the insulating layer 250 may occur. In particular, in a transistor component 200, the tunnelling is through the insulating layer 250 to the gate terminal 230 (or vice versa). This effect is sometimes referred to as gate leakage current and efforts in recent years have been made to reduce this leakage by, for example, attempting to use thicker insulator layers or use insulating materials with a higher dielectric constant. The inventors have, however, recognised that the gate leakage current is uniquely characteristic of the component and can be used to determine a unique identifier value of the component.

The gate leakage current is strongly correlated with the thickness (oxide thickness) of the insulator layer 250. A large (for example, greater than 3 nm) oxide thickness results in less quantum tunnelling of electrons, hence a low gate leakage current. On the other hand, gate leakage current increases significantly in the case of a thin oxide causing more electrons to tunnel. Gate leakage current increases exponentially with decreasing oxide thickness.

It is known that the oxide thickness varies on a lateral scale of 1 to 30 nm as well as on lateral scales of hundreds of nanometres. This variation is a random source of fluctuations. The thickness fluctuations are associated with the Si/SiO$_2$ interface roughness leading to tunnelling current density fluctuations of several orders of magnitude. Therefore, the gate leakage/quantum tunnelling current of the transistor 200 is unique and is not physically replicable by another component.

The transistor component 200 may be manufactured by any suitable process, such as growing a layer of silicon dioxide (SiO$_2$) on top of a silicon substrate and depositing a layer of metal or polycrystalline silicon. Multiple transistors may be manufactured on a wafer or substrate, each transistor having a unique quantum tunnelling barrier.

The unique tunnelling characteristics of the quantum tunnelling barrier 250 of the transistor 200 arise from deviations from the nominal characteristics of a component that arise during manufacture of the component.

Process variability is the naturally occurring variation in attributes of semiconductor components such as transistors when integrated circuits (IC) are fabricated. The amount of process variation is particularly relevant at small scales, where the variation may be a large percentage of the full length or width of the component and as feature sizes approach fundamental dimensions such as the size of atoms and the wavelength of light for patterning lithography masks. Process variability can be environmental, temporal, or spatial. Spatial variations cause performance differences among components, the differences dependent on the distances between the components or the locations of the components on, for example, an IC.

Typical spatial variations, such as line width or film thickness non-uniformity, universally exist across lots, across wafers (also known as slices or substrates), across chips and dies, and between circuit blocks and devices. That is, during the manufacture of any CMOS based device, variations from nominal device characteristics of a device will creep in due to lot-to-lot variations, wafer-to-wafer variations, chip-to-chip variations, and on-chip variations such as within-die variations.

Spatial variations can be further classified into systematic and random variations. Systematic variations are repeatable deviations from nominal device characteristics that depend on the component's spatial position due to the nonidealities of the lithographic system, chamber effects, optical proximity effects and strained silicon effects. Random variations on the other hand, are unpredictable features of device variability, such as non-uniformities resulting from random fluctuations in the fabrication process, microscopic fluctuations of the number and location of dopant atoms in a semiconductor channel (for example, in the channel between source and drain electrodes of a MOSFET), referred to as random dopant fluctuations (RDF), line-edge-roughness (LER), and atomic-scale oxide-thickness variation (OTV) due to interface roughness, for example, Si/SiO$_2$ interface roughness.

Random dopant fluctuations (RDFs) are a large source of random variation in modern CMOS processes and result from variation in the implanted impurity concentration. In particular, random dopant fluctuation refers to the random variations in the number and locations of dopant atoms in a material such as a metal-oxide semiconductor, for example in a channel region in a MOSFET. Random dopant fluctuations locally modulate the electric field and electron density in the material, to which the direct tunnelling current through the material is very sensitive and so leads to a measurable source of variation between electronic components. In a MOSFET, this means that RDFs have a large effect on gate leakage currents which result from quantum tunnelling through gate oxides. RDFs also cause disparities between electronic components for other electrical properties, such as the threshold voltage ($V_t$), short channel effect, and drain-induced barrier lowering (DIBL). With the gate length scaling down to sub-100 nm, the total number of dopant atoms under the gate is reduced to thousands or even hundreds, leading to significant variations in the threshold voltage and drive current for the transistor component.

For very small structures, for example a length of 100 nm or less, not only the discreteness of the dopant charge, but also the atomicity of matter introduces substantial variation in the individual component characteristics. For example, in a MOSFET, a gate oxide thickness at 25 nm is equivalent to a few silicon atomic layers with a typical interface roughness of one to two atomic layers. This introduces more than a 50% variation in the oxide thickness for a process with a 1 nm gate oxide/insulator layer.

As there is an exponential dependence of the gate leakage current (gate tunnelling current) on the gate oxide thickness, the oxide thickness variation (OTV) in a transistor component 200 also leads to differences in gate leakage currents between transistor components. Gate oxide thickness can vary on a lateral scale of hundreds of nm, as well as on a much smaller lateral scale of 1 to 30 nm. The thickness fluctuations on a smaller lateral scale are associated with Si/SiO$_2$ interface roughness, leading to a deviation from the nominal oxide thickness by one Si(001) inter-atomic plane distance. For a 1-1.5 nm thick SiO$_2$ gate dielectric, such thickness fluctuations lead to local tunnelling current density fluctuations of orders of magnitude, which increases the mean of the total tunnelling current, relative to that of a uniform transistor component.

The combined effects of RDFs and OTV greatly affect the gate leakage current variability. At high gate bias, gate leakage variability is dominated by the effects of oxide thickness variation, and discrete doping atoms have a negligible impact. This can be explained because at high gate bias, the excess electron charge in the substrate screens the bare potential of the ionised impurities, and the RDF induced fluctuations of the tunnelling current density become too localised, compared to the OTV induced fluctuations.

Line-edge roughness (LER) is another source of intrinsic gate leakage variability. Line edge roughness is caused by the tendencies of lithographic photoresists to aggregate in polymer chains. These aggregates are large enough to locally affect the speed of the resist development process, which translates to a loss of resolution and low fidelity of the line edge. This is of importance for the formation of the gate pattern, and translates to an uncertainty of the gate length along the width of the device. Although the leakage gate current is linearly proportional to the gate dimensions, it must be kept in mind that the distribution of random impurities forming the source and drain extension is correlated to the gate line edge roughness.

In MOS structures, such as in electronic component 200, one may distinguish three different quantum tunnelling processes such as Fowler-Nordheim tunnelling, direct tunnelling, and trap-assisted tunnelling.

In direct tunnelling, charge carriers can tunnel directly through the potential barrier that is formed by the conducting band. The significance of direct tunnelling is exponentially dependent on the thickness of the oxide (e.g. insulator layer 250) and the oxide perpendicular field, but it is only linearly sensitive to the gate width and source/drain extension overlaps. Direct tunnelling may involve electrons tunnelling from the conduction band of the substrate to the conduction band of the gate terminal 230 (or vice versa) which is known as electrons in the conduction band (ECB), or electrons tunnelling from the valence band of the substrate to the conduction band of the metal which is known as valence band tunnelling (EVB).

The direct tunnelling current density can be modelled by $$J_{DT} = \frac{q^3}{16\pi^2\hbar\phi_{ox}}\left(\frac{V_{ox}}{T_{ox}}\right)^2 \exp\left(\frac{\frac{4\sqrt{2m^*}\,\phi_{ox}^{3/2}}{3\hbar q}\left(1-\left(\frac{V_{ox}}{\phi_{ox}}\right)^{3/2}\right)}{\frac{V_{ox}}{T_{ox}}}\right)$$

where $J_{DT}$ is the direct tunnelling current density, $V_{ox}$ and $\phi_x$ are the potential drop across the gate oxide and the tunnelling barrier height respectively, $m^*$ is the effective mass of an electron in the conduction band of silicon, and $T_{ox}$ is the oxide thickness.

The direct quantum tunnelling current can be expressed as:

$$I_9 = W \cdot L \cdot J_{DT}$$

where W and L are the effective transistor width and length respectively.

Furthermore, the quantum tunnelling current exhibits a weak temperature dependence because the electric field across the oxide does not strongly depend on temperature. Advantageously, this means that an identifier value determined from a measured electrical signal representative of the quantum tunnelling current through an insulating layer 250 of a transistor 200 is largely insensitive to temperature and thus is more reproducible than an identifier based on a mechanism that is temperature dependent.

Figure 3:
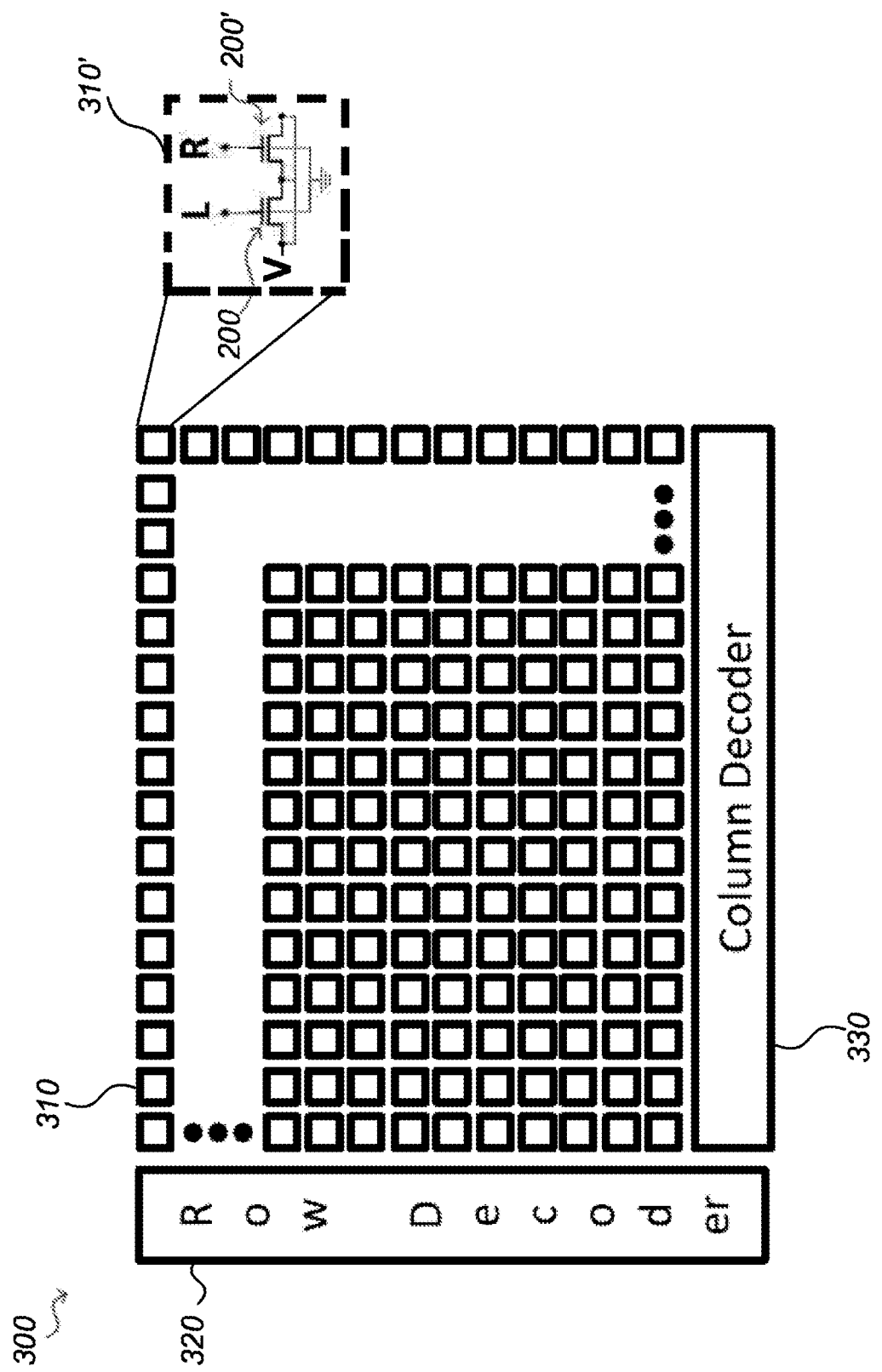
FIG. 3 shows an array comprising a plurality of cells, each cell comprising an electronic component having a quantum tunnelling barrier.

FIG. 3 shows a block diagram of an array 300 for use in identifying a device. As can be seen in FIG. 3, the array/arrangement 300 comprises a plurality of cells 310. Each cell of the plurality of cells can be individually addressed using row decoder 320 and column decoder 330. The array 300 may comprise any number of cells 310. A cell may be considered as a unit of the array 300 that can be selectively probed. In the example shown in FIG. 3, each cell 310 comprises a single elementary circuit having a quantum tunnelling barrier, although the skilled person would appreciate that a cell may comprise, for example, an entire row or column of the array, or some other addressable unit of the array. That is, with reference to FIG. 3 a cell and an elementary circuit are taken to mean the same thing but this need not be the case. When a cell comprises several elementary circuits, for example a row or column of the array, the determined identifier for the cell may be determined based on quantum tunnelling currents through the quantum tunnelling barriers of each elementary circuit of the cell.

In FIG. 3, at least a portion of the electronic circuit making up a particular unit cell 310'/elementary circuit of the array 300. Each cell 310 of the array 300 may comprise ostensibly the same electronic circuit as particular unit cell 310', or may vary—for example some cells of the array 300 may comprise capacitors in place of transistors, or a combination of transistors and capacitors.

Particular cell 310' comprises a first electronic component in the form of a transistor (which has for that reason been labelled 200 in line with FIG. 2), and a second electronic component in the form of a second electronic transistor 200'. The source 210, drain 220, and body 240 of the first transistor 200 are all held at the same potential (shown as ground). The source 210', drain 220', and body 240' of the second transistor are also all held at that same potential. The first transistor 200 has a first quantum tunnelling barrier 250 between the channel of the transistor 200 and the gate terminal 230 (labelled as "L" in FIG. 3). The second transistor 200' has a second quantum tunnelling barrier 250' between the channel of the transistor 200' and the gate terminal 230' (labelled as "R" in FIG. 3). As explained above, due to inherent differences in the transistors introduced during manufacture, the first quantum tunnelling barrier 250 uniquely characterises the first transistor 200 and the second quantum tunnelling barrier 250' uniquely characterises the second transistor 200'. The cell 310' may be selected using the row decoder 320 and column decoder 330 to apply a voltage to terminal "V" in order to apply a potential difference across the first quantum tunnelling barrier and the second quantum tunnelling barrier. The potential difference may be below a threshold voltage for which current would classically be able to pass through either the first quantum tunnelling barrier or the second quantum tunnelling barrier. Accordingly, once a cell is selected, a quantum tunnelling current may flow through the first quantum tunnelling barrier of the first transistor 200 and a quantum tunnelling current may flow through the second quantum tunnelling barrier of the second transistor 200', and classical current may not flow.

Due to the inherent differences between the oxide layers of the first transistor 200 and the second transistor 200', a first quantum tunnelling current through the first transistor 200 to terminal "L" is inherently different to the second quantum tunnelling current through the second transistor 200' to terminal "R" for that potential difference across the barriers. Tunnelling currents measured from terminals "L" and "R" (or other electrical signals representative of those tunnelling currents) are characteristic of the transistors 200 and 200' and are therefore characteristic of the particular cell 310'.

The skilled person would appreciate that the particular cell 310' is but one example of a cell 310, and that cells of the array may be very different. For example, although two electronic components 200, 200' are illustrated in FIG. 3, each having a quantum tunnelling barrier, there may be more electronic components, each having a quantum tunnelling barrier (uniquely characterising that component). For example, each cell may comprise three components, or four components, or more components, each having a thin quantum tunnelling barrier.

A cell may comprise two components having quantum tunnelling barriers for use in establishing an identifier of the cell, and as would be appreciated by the skilled person many architectures besides that shown for particular cell 310' are possible.

In other examples, each cell comprises a single electronic component having a quantum tunnelling barrier (in contrast to multiple components as in particular cell 310') for use in establishing an identifier value for the cell (and in turn for the device). For example, a cell may comprise a capacitor between terminals "V" and "L" and there may be no terminal "R".

A quantum tunnelling current from a cell 310 of an array 300 is usually very small (on the scale of nano-amperes or smaller). Each cell 310 may comprise further electronic circuitry to be able to handle such small currents, for example a switching circuit in order to be able to effectively turn the cell "off". Such circuitry has been described in United Kingdom patent application no. 1807214.0, entitled "Near-zero leakage switching circuit" and filed on 2 May 2018, which is incorporated by reference herein in its entirety for all purposes.

Figure 4:
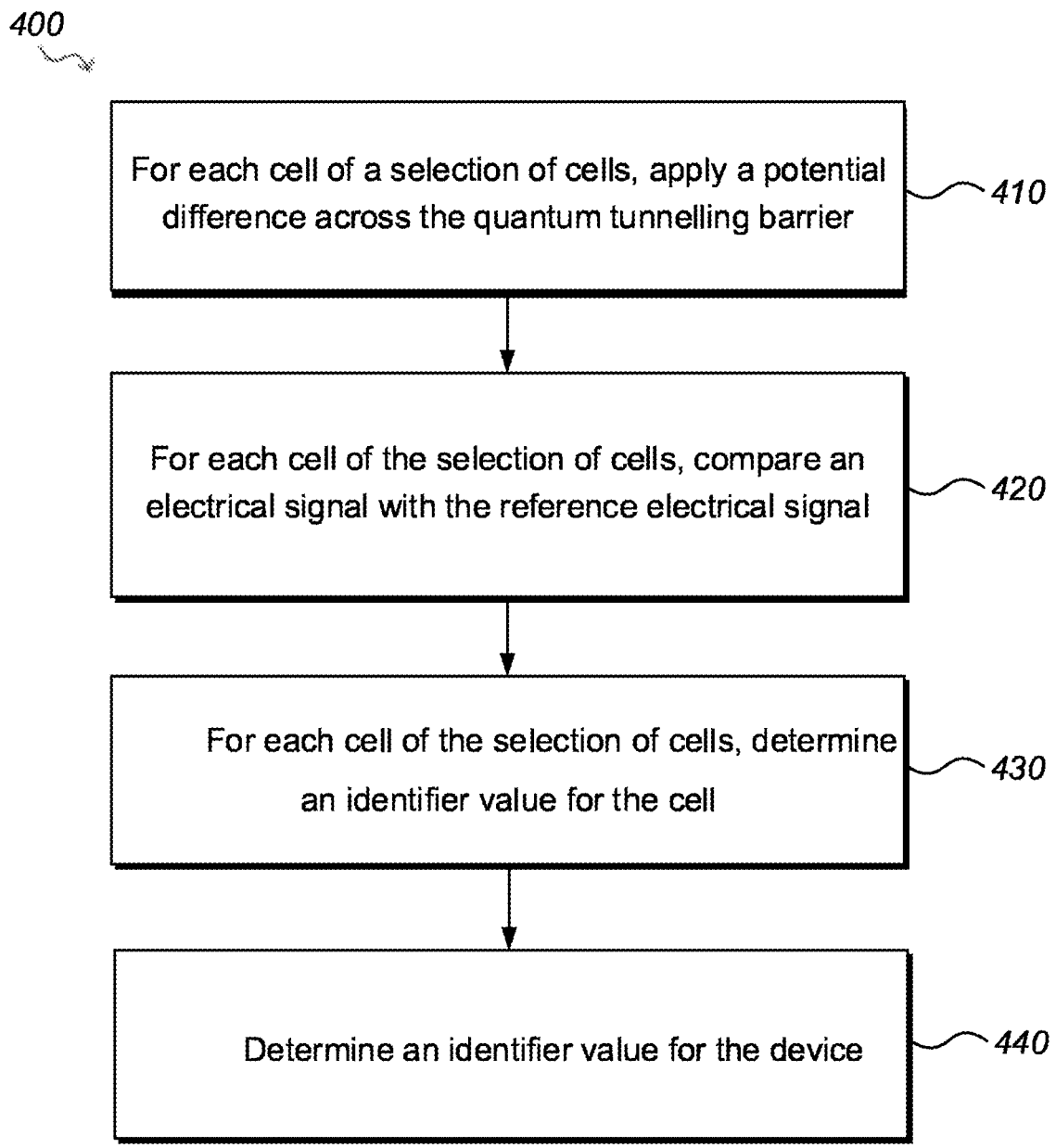
FIG. 4 shows a flowchart of a method for determining an identifier value for a device.

FIG. 4 shows a flowchart of a method for determining an identifier value of a device, the device comprising an array of individually addressable (selectable) cells, each cell comprising an electronic component having a quantum tunnelling barrier. The discussion of FIG. 4 below is with reference to FIG. 3, but the skilled person would appreciate that the method of FIG. 4 is applicable more generally to other array designs.

At 410, for each cell of a selection of the individually addressable cells, a potential difference is applied across an electronic component of the cell, the potential difference sufficient to enable tunnelling of charge carriers (for example holes or electrons) through the quantum tunnelling barrier. With reference to FIG. 3, particular cell 310' may be selected and a potential difference applied between terminals "V" and "L", and also applied between terminals "V" and "R".

At 420, for each cell of the selection of the individually addressable cells, an electrical signal representative of the quantum tunnelling current through the quantum tunnelling barrier is compared with a reference electrical signal. With reference to FIG. 3, an electrical signal representative of the second tunnelling current (terminals "R") through the second electronic component 200' of the selected cell 310' may be considered as the reference electrical signal for that cell, and an electrical signal representative of the first quantum tunnelling current (terminal "L") through the first electronic component 200 of the selected cell 310' may be compared against that reference electrical signal for the cell.

The skilled person would appreciate that the reference electrical signal may be any suitable reference electrical signal. For example, the reference electrical signal may be a tunnelling current through a reference cell of the array. For example, each cell of the array may have one electronic component having a quantum tunnelling barrier and the quantum tunnelling current through that barrier may be compared with a quantum tunnelling current from a reference cell. In an example, the reference cell may also be selectively chosen, for example so that a signal from a first cell of the array is compared with a signal from a second cell of the array, while a third cell of the array is compared with a fourth cell of the array.

In other examples, the reference electrical signal may be a reference signal common to all of the cells, for example a signal external to the array. That is, a common reference electrical signal may be used at 420.

At 430, for each cell of the selection of the individually addressable cells, an identifier value for that cell is determined based on the comparison. With reference to FIG. 3, in an example, if the electrical signal representative of the first quantum tunnelling current through terminal "L" (i.e. passing through the first transistor 200 of unit cell 310'), is found to be greater than the reference electrical signal (e.g. that electrical signal representative of the second quantum tunnelling current through terminal "R" of unit cell 310'), then the identifier value for that cell may be determined to be a "1". In the example, if the electrical signal representative of the first quantum tunnelling current through terminal "L" is found to be less than the reference electrical signal, then the identifier value for that cell may be determined to be a "0". In this way, an identifier value can be determined for each cell of the selected individually addressable cells of the array 300. Of course, the skilled person would appreciate that the identifier value for the cell may not be a binary bit but may be some other suitable value, for example a current or voltage value.

At 440, an identifier value for the device is determined. In one example, the identifier value for the device may comprise a bit string, for example a concatenation of bit values produced at step 430 when determining identifier values for each cell of the selection of cells.

The identifier value for the device (for that selection of cells) may be determined in any suitable way. As another example, an ordered concatenation of bit values produced from selected cells 310 of the array 300 may be input into a cryptographic hash function. A hash function is any function that can be used to map data of arbitrary size onto data of a fixed size. A cryptographic hash function is a special class of hash function that has certain properties which make it suitable for use in cryptography, in particular mapping data of arbitrary size to a bit string of a fixed size (a hash) using a one-way function, that is, a function which is infeasible to invert. Accordingly, the hash value resulting from an ordered concatenation of bit values at step 430 is highly dependent on the ordering. The use of a hash function advantageously enlarges the number of potential challenge-response pairs when using the array 300 as a PUF, as a challenge may comprise a selection of the cells 310 of the array as well as an ordering. Device identifier values may be usable for generating a public key and a private key of an asymmetric cryptographic public and private key pair.

Figure 5:
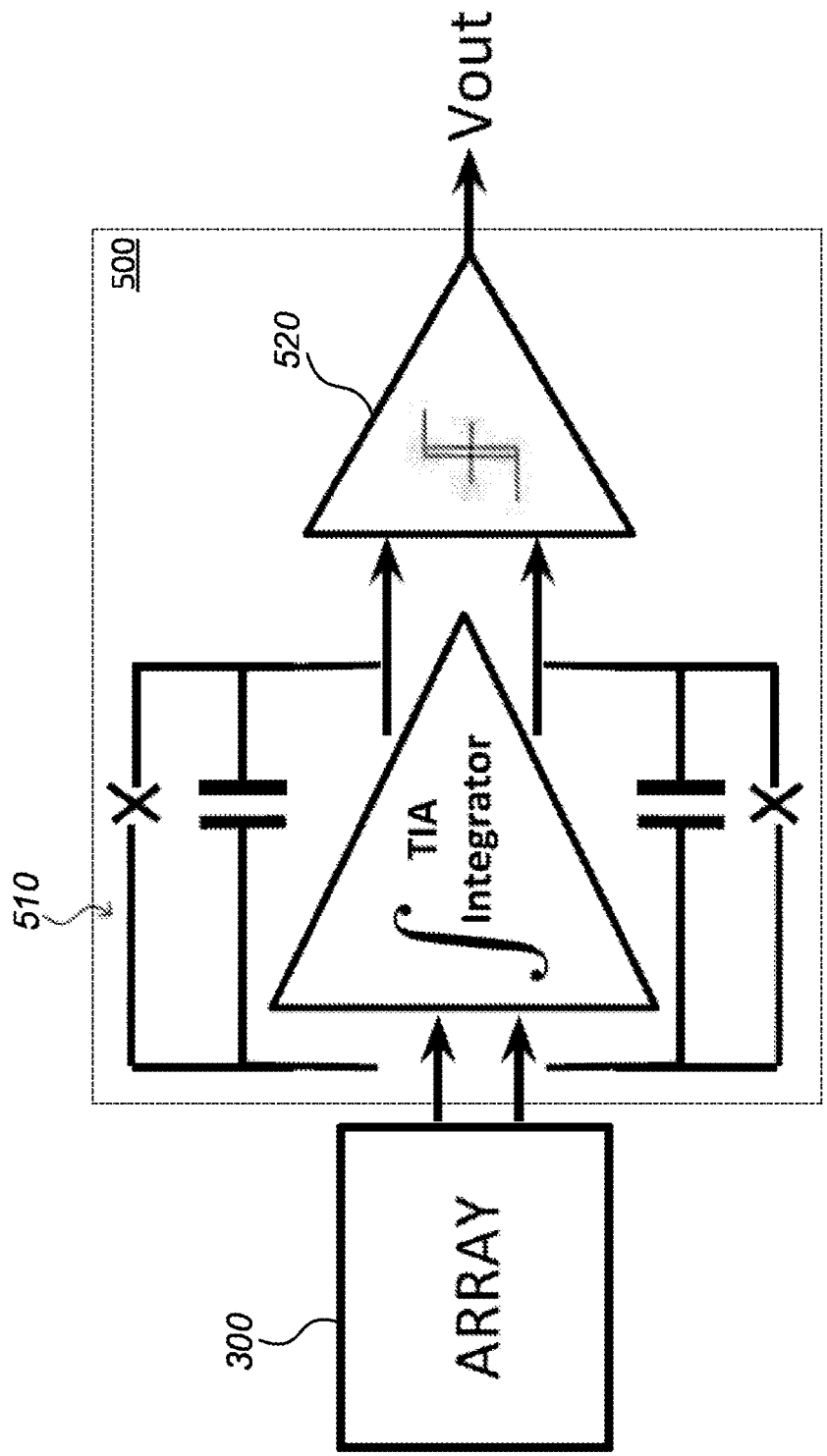
FIG. 5 shows an array and processing circuitry.

FIG. 5 shows an array 300 and example processing circuitry 500 for extracting identifier values from the array 300. In particular, FIG. 5 shows two signals from the array 300 (e.g. two signals from "L" and "R" terminals of a particular cell 310' of the array 300), although the skilled person would appreciate that in other examples, only one of the signals may be retrieved from the array 300 and a reference electrical signal external to the array 300 may be used for comparison (a signal for each cell may be compared to a common reference signal).

Processing circuitry 500 comprises a transimpedance amplifier, TIA, 510. Although in FIG. 5, only one TIA is illustrated, the processing circuitry 500 may comprise a first TIA and a second TIA to amplify the tunnelling currents from two outputs of each cell, for example, to respectively amplify the signals from "L" and "R" in cell 310' of array 300 of FIG. 3. The transimpedance amplifier 510 is configured to convert a quantum tunnelling current from a selected cell 310 of the array 300 to a voltage and to amplify the signal. For example, the TIA 510 may be a single-ended TIA and may be configured to convert the tunnelling current through the first electronic component 200 of cell 310' (terminal "L") to an amplified voltage. The amplified voltage can be used as the electrical signal representative of the tunnelling current through a quantum tunnelling barrier and compared with a reference voltage (reference electrical signal) to determine an identifier for the selected cell 310. A second TIA may be configured to convert the tunnelling current through the second electronic component 200' of cell 310' (terminal "R") to an amplified reference voltage. Any suitable TIA may be used, as would be appreciated by the skilled person. With reference to FIG. 3, the TIA 510 may be configured to, for each cell 310 of the selection of the individually addressable cells 310 of the array 300, produce an amplified voltage from a quantum tunnelling current, wherein the electrical signal representative of the quantum tunnelling current comprises the amplified voltage.

The TIA 510 may have source-measure capabilities, such that is can also act as a source-measure unit. For example, the TIA 510 may be configured to apply a potential across an electronic component of a cell 310 of the array 330 and also convert the resultant small quantum tunnelling current into a voltage representative of the quantum tunnelling current. With reference to FIG. 3, the TIA 510 may be configured to, for each cell 310 of the selection of the individually addressable cells 310 of the array 300, apply the potential difference across the electronic component of the cell 310 required to enable quantum tunnelling through the quantum tunnelling barrier of the component.

The processing circuitry 500 further comprises a comparator 520 configured to compare electrical signals, for example voltages or currents, and output a digital signal indicating which is greater (or alternatively outputting a digital signal indicating which input is lesser). The comparator 520 may comprise a latched (clocked) comparator, such that the inputs can be compared at particular instances in time. The inputs to the comparator 520 may comprise the electrical signal (e.g. amplified voltage) from the TIA 510 and a reference electrical signal. The output of the comparator 520 may be an output voltage interpretable as a bit value, such as a zero or a one. The comparator 520 is therefore configured to, for each cell 310 of the selection of the individually addressable cells 310 of the array 300, compare the electrical signal representative of the tunnelling current through the quantum tunnelling barrier of the electronic component of the cell 310 with the reference electrical signal.

Although not shown in FIG. 5, the identifier value for each cell can be processed by a processor and used to determine an identifier value for the array 300 or the device in which it is installed based on the selection of cells chosen.

The skilled person would appreciate that the processing circuitry 500 may take another form. For example, processing circuitry may comprise some other amplification means, for example a current amplifier. In another example, processing circuitry may comprise further electronic components to further process the signals before and/or after the signals are compared.

Figure 6:
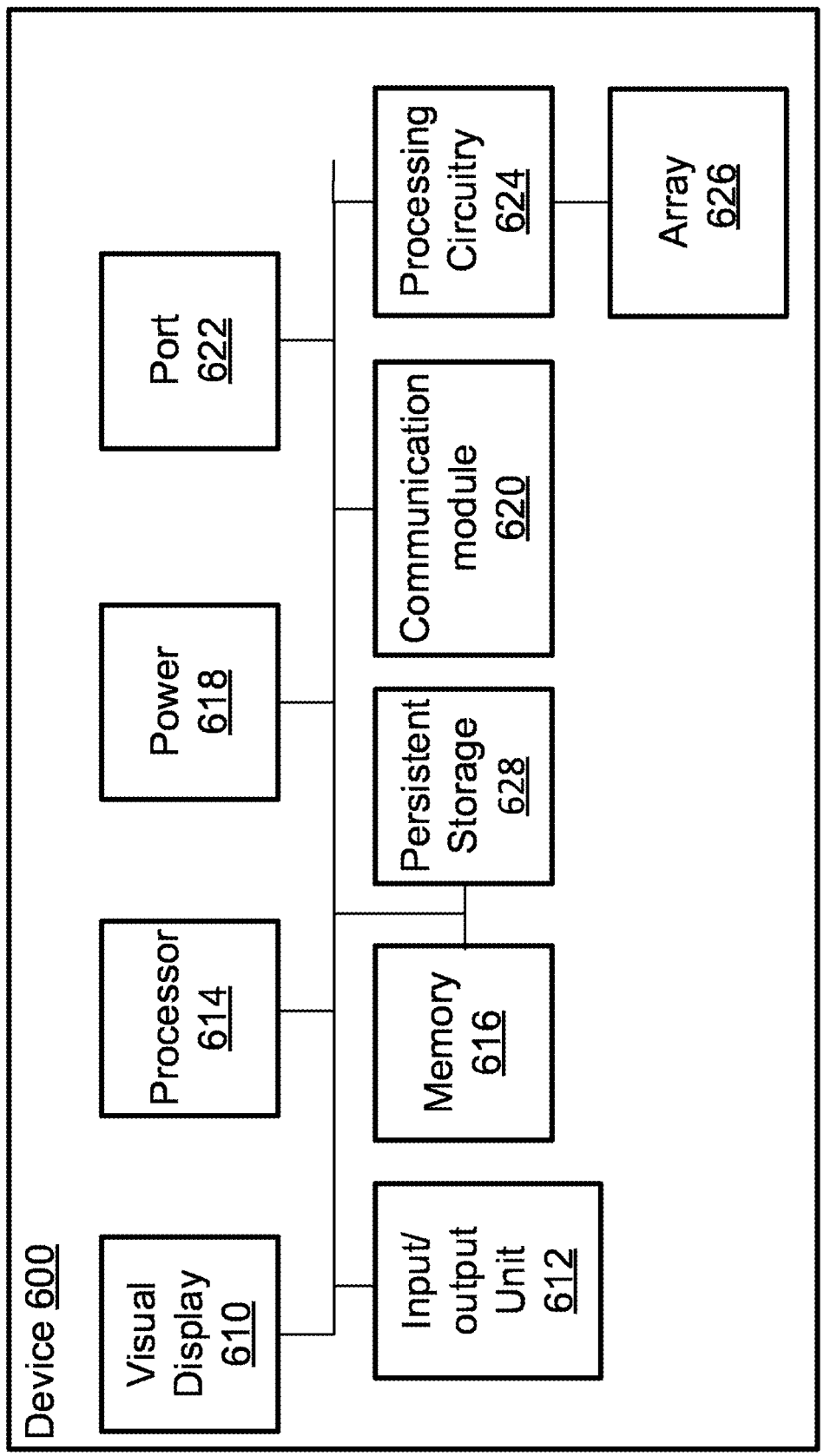
FIG. 6 shows a block diagram of a device.

FIG. 6 depicts a block diagram of a device 600. The device/data processing system 600 is an example of a computer, in which computer usable program code or instructions implementing the processes may be located and acted upon. The skilled person would appreciate that other architectures are envisaged. Device 600 may perform the method of FIG. 4 of determining an identifier value of a device.

The device 600 includes a number of user interfaces including visualising means such as a visual display 610 and a virtual or dedicated user input/output unit 612. Input/output unit 612 allows for input and output of data with other devices/users that may be connected to device 600. For example, input/output unit 612 may provide a connection for user input through a keyboard, a mouse, and/or some other suitable input device. Further, input/output unit 612 may send output to a printer.

The device 600 further includes one or more processors 614, a memory 616, a persistent memory 628, and a power system 618.

The device 600 comprises a communications module 620 for sending and receiving communications between processor 614 and remote systems. For example, communications module 620 may be used to send and receive communications via a network such as the Internet. Communications module 620 may provide communications through the use of either or both physical and wireless communications links.

The device further comprises a port 622 for receiving, for example, a non-transitory computer-readable medium containing instruction to be processed by the processor 614.

The device further comprises an array 626, for example the array 300 of FIG. 3, and processing circuitry 624 for interfacing with the array 626. The array 626 comprises a plurality of individually addressable cells, and each cell of the plurality of individually addressable cells comprises one or more electronic components having a quantum tunnelling barrier. The processing circuitry 624 comprises means for interacting with the array 626 in order to operate with the processor 614 to determine an identifier for the device 600.

Memory 616 and persistent storage 628 are examples of storage devices. A storage device is any piece of hardware that is capable of storing information, such as, for example, without limitation, data, program code in functional form, and/or other suitable information either on a temporary basis and/or a permanent basis. Memory 616, in these examples, may be, for example, a random access memory or any other suitable volatile or non-volatile storage device. Persistent storage 628 may take various forms depending on the particular implementation. For example, persistent storage 628 may contain one or more components or devices. For example, persistent storage 628 may be a hard drive, a flash memory, a rewritable optical disk, a rewritable magnetic tape, or some combination of the above. The media used by persistent storage 628 also may be removable. For example, a removable hard drive may be used for persistent storage 628.

Instructions for the processor 614 may be stored. For example, the instructions may be in a functional form on persistent storage 628. These instructions may be loaded into memory 616 for execution by processor 614.

Processor 614 serves to execute instructions for software that may be loaded into memory 616. Processor unit 614 may be a set of one or more processors or may be a multi-processor core, depending on the particular implementation. Further, processor unit 614 may be implemented using one or more heterogeneous processor systems in which a main processor is present with secondary processors on a single chip. As another illustrative example, processor unit 614 may be a symmetric multi-processor system containing multiple processors of the same type.

The processor 614 is configured to receive data, access the memory 616 and persistent storage 628, and to act upon instructions received either from said memory 616 or persistent storage 628, from communications module 620 or from user input device 612.

The processor 614 is further configured to interface with the processing circuitry 624 to control interactions with the array 626. The term "processing circuitry" should be interpreted broadly, and accordingly, the processing circuitry in some embodiments may also comprise one or more processors in its own right.

The processor 614 is configured to select a selection of cells of the array 626 to probe. The selection may be provided to the processor 614 from a third party. For example, a "challenge" may be received at the processor 614 from a remote party such as controller 700 of FIG. 7 via communications module 620, the remote party seeking to authenticate the device 600. The challenge may comprise information which, when processed by the processor 614, is used to make a selection of the cells of the array 626.

The processor 614 is configured to cause the processing circuitry 626 to, for each cell of the selection of cells, apply a potential difference across the quantum tunnelling barrier of the electronic component (e.g. transistor 200) within that cell. The processor 614 may be configured to receive, from the processing circuitry 624, either an indication of an identifier value for the device 600 (corresponding to the selection of cells) or an indication of an identifier value for each cell of the selected plurality of cells in turn. The processor 614 may be configured to determine an identifier value for the device 600 from the received indications of identifier values for each selected cell of the array 626.

The processor 614 may be configured to communicate the determined identifier value for the device 600 to the remote party from which the challenge originated via communications module 620. That is, the processor may be configured to receive the challenge and coordinate transmission of a response. The remote party may use the response to at least in part determine the identity of the device/authenticate the device.

Although FIG. 6 has been described with reference to a device 600, the skilled person would appreciate that the device may comprise any suitable device, for example a server or mobile electronic device. The device may comprise an internet-of-things device. The device may comprise a CMOS chip/integrated circuit. Many of the features of the device 600 may be provided on the chip. A device may comprise an array and processing circuitry such as a processor to determine an identifier value from probing the array.

Figure 7:
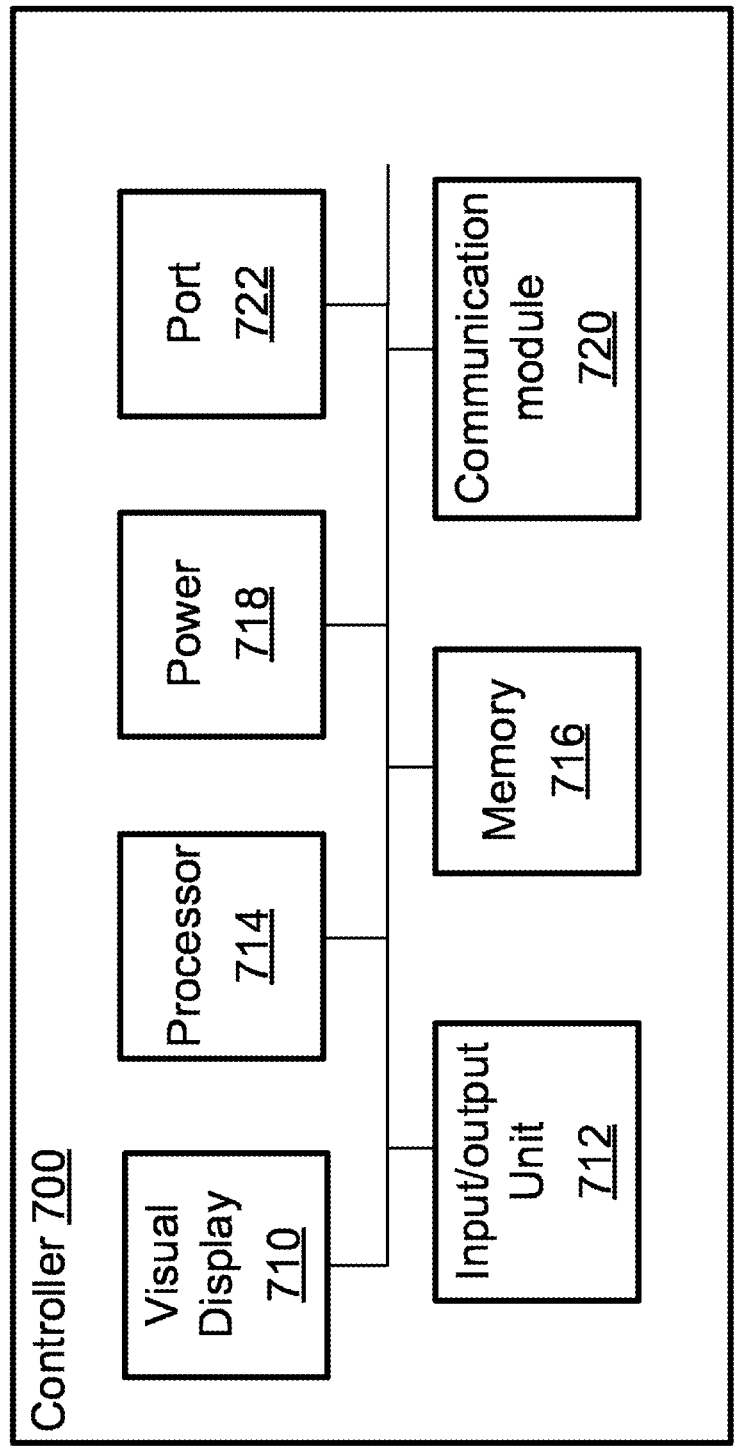
FIG. 7 shows a block diagram of a controller/another device.

FIG. 7 shows a block diagram of a controller 700. Much like device 600, the controller also comprises a number of user interfaces including visualising means such as a visual display 710 and a user input/output unit 712. The controller 700 further comprises a processor 714, memory/storage unit 716, a power supply 718, a communication module 720 and a port 722. The features of controller 700 may operate similarly to their counterpart features in device 600.

The controller 700 may be an enroller or enrolment authority, or may be an authenticator or authentication authority.

For enrolment, the controller 700 may be configured to communicate a challenge (i.e. an indication of a selection of the cells of the array 626 of device 600) to the device 600 via communications module 720. The selection may be an ordered selection, for example the communication may instruct the device 600 to determine identifier values for selected cells in a chosen order. The processor 714 may, via the communications module 720, receive an identifier value for the device 600. The device 700 may then store in storage 716 the selection of cells (i.e. the challenge) along with any other relevant information such as whether the selection is an ordered selection, and may also store in storage 716 the corresponding response. The controller 700 may repeat for each combination of possible cells of the array 626 in order to build up a database or lookup table of challenge-response pairs.

For authentication, the processor 714 may be configured to communicate a challenge (i.e. an indication of a selection of the cells of the array 626 of device 600) to the device 600 via communications module 720. The processor 714 may, via the communications module 720, receive an identifier value for the device 600. The processor 714 may consult a look-up table in storage 716 and determine whether or not the received device identifier value matches an expected value based on the contents of the look-up table. The processor 714 may send as many challenges and receive as many responses as required to verify that the controller 700 is in fact communicating with a device (device 600) having that particular array 626.

The skilled person would understand that the examples described above in relation to FIGS. 6 and 7 are not limiting and that other architectures are possible. For example, a device/apparatus comprising an array of components having quantum tunnelling barriers may comprise, for example, an integrated circuit (IC) or microchip. The components shown in FIGS. 6 and 7 are not limiting. The skilled person would appreciate that any suitable combination of components may be used, for example an apparatus/device may or may not comprise one or more of the user input device 612, 712, a visual display 610, 710, or a memory/storage 616, 628, 716, a power supply or a port 622, 722.

Figure 8:
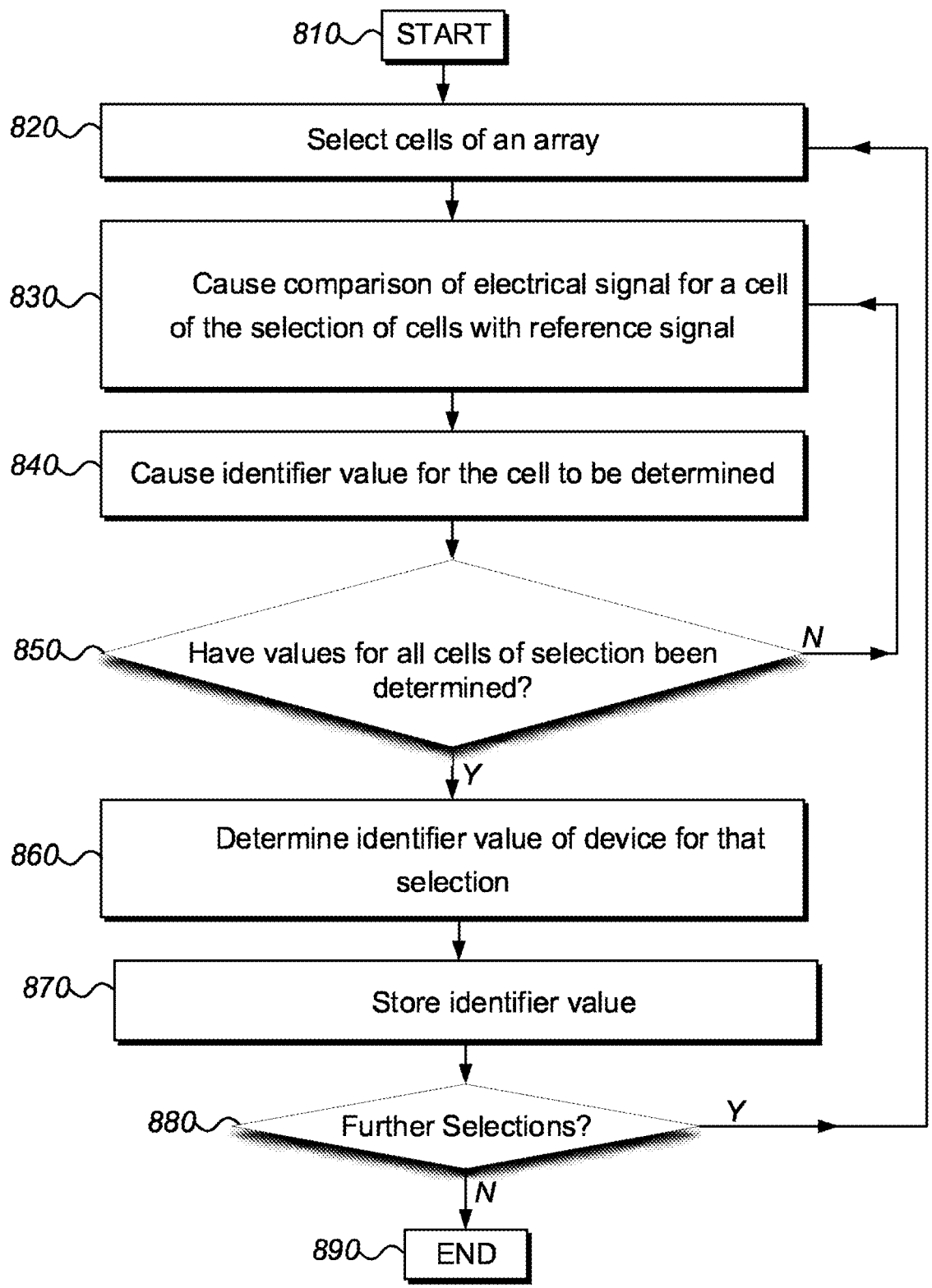
FIG. 8 shows a flowchart of a method of enrolling a device.

FIG. 8 shows a flowchart of a method for enrolling a device such as device 600, and may be performed by any suitable apparatus. As an example, the circuitry of the device 600 may be used itself to establish a series of challenge-response pairs which are sent to an external storage device via port 622, the external storage device for use by an authenticator in later communications. Enrolment may take place, for example, after a device such as device 600 is manufactured and before the device has left the factory. The method is for establishing a number of challenge-response pairs for use in authentication of the a device having an array, such as device 600. At 810 the method begins.

At 820, a first selection of cells of an array is made. For each cell of the selection of cells, a potential difference is caused to be applied across the electronic component within that cell to cause a quantum tunnelling current to flow, and an electrical signal representative of the quantum tunnelling current is compared to a reference electrical signal (830). An identifier value for the cell based on the comparison may be stored, permanently or temporarily (840).

If identifier values have not yet been identified for all cells of the selection of cells, then the method returns to step 830 to evaluate the next cell. If identifier values for all cells of the selection of cells have been determined, then an identifier value for the device (based on that selection) is determined (860).

The determined identifier value for the device is stored along with an indication of the selection of cells (870). Any other further information required is also stored. For example, the challenge may comprise an ordered list of selected cells, and the determined identifier value for the device may comprise a hash value of a concatenation of the identified values for each cell of the selection of cells in corresponding order. In such a case, an indication of the order can also be stored.

At 880, if the table of challenge response pairs (i.e. if no further selections of the cells of the array are necessary) then the method ends (890). Otherwise, if further selections/identifier values are required, then the method returns to 820.

Figure 9:
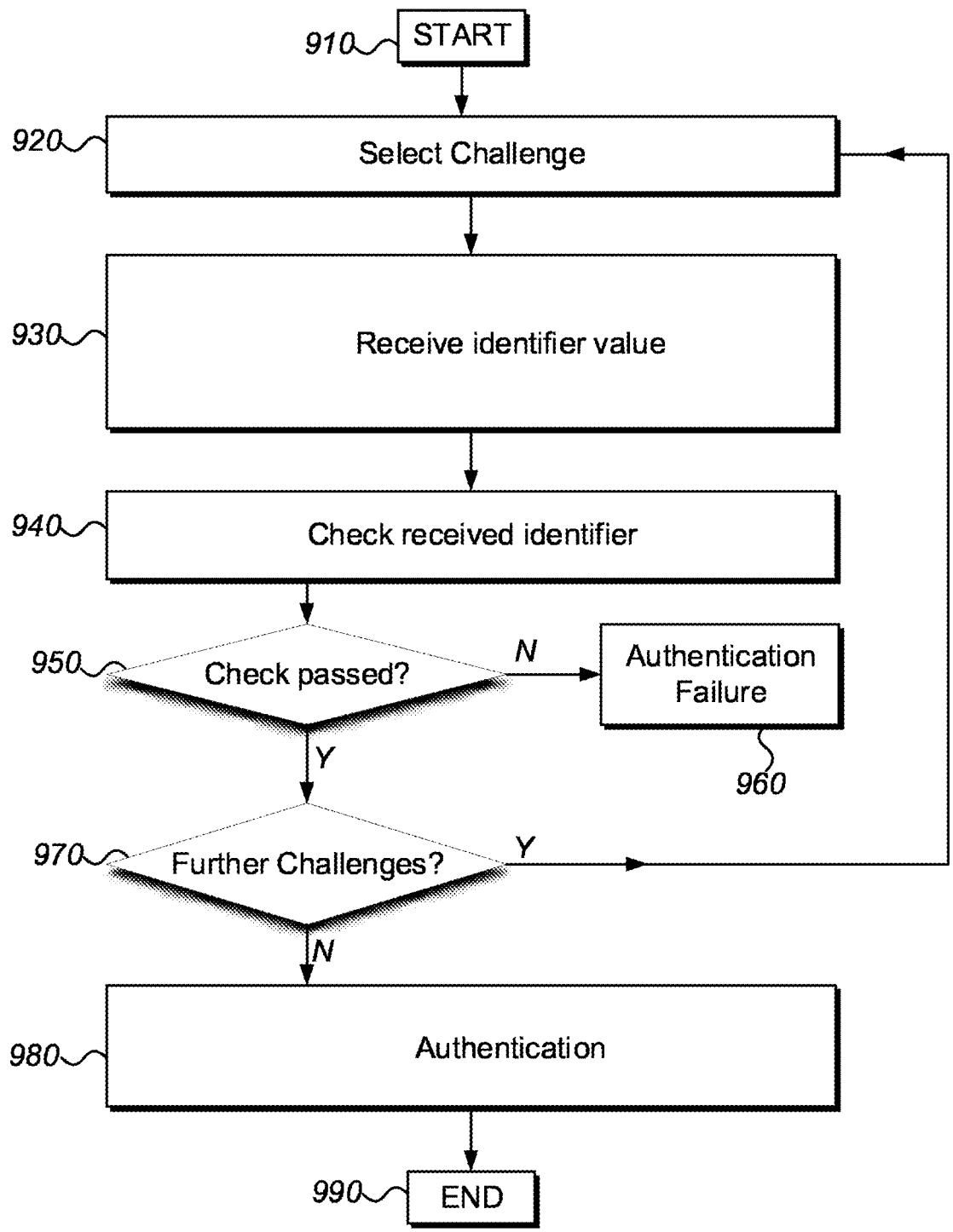
FIG. 9 shows a flowchart of a method of authenticating a device.

FIG. 9 shows a flowchart of a method for authenticating a device having an array of individually addressable cells, each cell comprising an electronic component having a quantum tunnelling barrier. The device may be a device such as device 600. The skilled person would appreciate that the method of FIG. 9 is an example of just one way of authenticating a device. The method begins at 910.

At 920, a first challenge is selected. The challenge comprises an indication of cells of an array.

At 930, an identifier value for the device is received, i.e. a purported response of a challenge-response pair. The identifier value for the device may be determined using the method 400 of FIG. 4.

At 940, the received identifier value if checked. In particular, a look-up table may be consulted to verify that the received identifier value matches an expected identifier value associated with the selected challenge.

If (950) the received identifier does not match the expected identifier, then authentication may be considered to have failed (960). If however, the received identifier matches the expected identifier, then the method continues to 970.

If (970) the authentication protocol requires that several challenges be successfully resolved, then the method returns to 920 and a further challenge is selected.

One a required number of challenges have been successfully resolved, an authenticator may determine that the responses do in fact correspond to a device (device 600) having the specific array 626. The method ends at 990.

Figure 10:
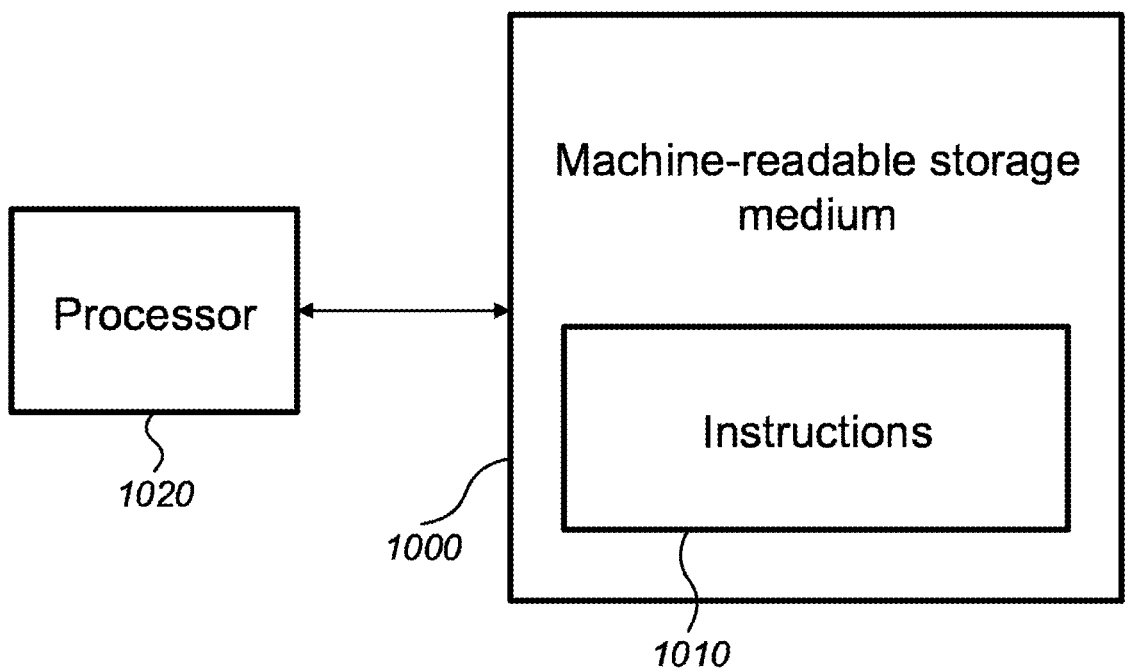
FIG. 10 shows a block diagram of a computer-readable medium.

FIG. 10 illustrates a computer readable medium 1000 according to some examples. The computer readable medium 1000 stores units, with each unit including instructions 1010 that, when executed, cause a processor or other processing device to perform particular operations. The computer readable medium 1000 includes instructions 1010 that, when executed, cause a processing device to cause an application of a potential difference across individual cells of an array, to determine an identifier value for the cells of an array, and in turn to determine an identifier value of the device in which the array is installed.

A computer-readable medium such as computer-readable medium 1000 may be able to interact with a device having an array such as device 600 via a port e.g. port 622 of the device 600.

A computer-readable medium such as computer-readable medium 1000 may also be suitable for storing a set of challenge-response pairs for a particular array. For example, the computer-readable medium may store first information related to a selection of cells of the particular array. The computer-readable medium may further store second information related to an identifier value for the array, the identifier value determinable from the array by performing a method as described herein.

Variations of the described embodiments are envisaged, for example, the features of all of the disclosed embodiments may be combined in any way and/or combination, unless such features are incompatible.

A capacitor is an example of another component which may be feature in a cell of the array. There are many capacitor designs but in its simplest form a capacitor comprises two conductive plates separated by a dielectric medium. When the dielectric medium is sufficiently thin (for example an average thickness of less than 3 nm), the dielectric does not act as a perfect insulator and so a leakage current may flow through the dielectric under when a potential difference is applied across the two plates. This small DC current flow in the region of nano-amps (nA) is based on quantum tunnelling. Leakage current is a result of electrons physically making their way through the dielectric medium and is often seen as an unwanted artefact as, over time, the capacitor will fully discharge if the supply voltage is removed. The inventors have though realised that the leakage current of a capacitor can be used to uniquely identify that capacitor. Accordingly, a capacitor may also be used as the electronic component of the array.

A quantum tunnelling barrier as described herein may be of any suitable thickness such that quantum tunnelling through the barrier can occur. For example, the quantum tunnelling barrier may be less than 5 nm, or less than 4 nm, or less than 3 nm, or less than 2 nm or less than 1 nm. The quantum tunnelling barrier may be formed of any suitable insulating material such as a dielectric oxide. Although silicon has been mentioned throughout this specification other materials may be used, such as III-V materials. In order to form the quantum tunnelling barriers, dielectrics with any suitable k-value may be used.

Throughout the specification, transistor devices have been described. The skilled person will appreciate that the transistor devices may be p- or/and n-doped transistor devices and that the dopant density of the devices can also be varied.

A device as described herein may be any suitable device, for example a metal oxide semi-conductor device, or a metal-insulator semiconductor device. A device may comprise a component, a chip, a computer, a tablet, a mobile phone or any other such device.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine-readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method for determining an identifier value of a device, the device comprising an array of individually addressable cells, each cell comprising an electronic component having a quantum tunnelling barrier, the method comprising:

for each cell of a selection of the individually addressable cells of the array:
applying a potential difference across the electronic component of the cell, the potential difference sufficient to enable tunnelling of charge carriers through the quantum tunnelling barrier;
comparing an electrical signal representative of a quantum tunnelling current through the quantum tunnelling barrier with a reference electrical signal; and
determining, from the comparison, an identifier value for the cell; and
determining, from the identifier values of each cell of the selection of individually addressable cells, an identifier value for the device.

2. A method according to claim 1, wherein:
- if the electrical signal is greater than the reference electrical signal then the identifier value for the cell is determined to be a first bit value; and
- if the electrical signal is less than the reference electrical signal then the identifier value for the cell is determined to be a second bit value different to the first bit value.

3. A method according to claim 1, wherein the electronic component of each cell comprises a transistor or a capacitor.

4. A method according to claim 1, wherein the electronic component having a first quantum tunnelling barrier is a first electronic component having a first quantum tunnelling barrier, and wherein each cell further comprises a second electronic component having a second quantum tunnelling barrier, and wherein the method further comprises:
- for each cell of the selection of the individually addressable cells of the array:
  - applying a potential difference across the second electronic component of the cell, the potential difference sufficient to enable tunnelling of charge carriers through the quantum tunnelling barrier.

5. A method according to claim 4, wherein comparing an electrical signal representative of a quantum tunnelling current through the quantum tunnelling barrier with a reference electrical signal comprises:
- comparing a first electrical signal representative of a first quantum tunnelling current through the first quantum tunnelling barrier with a second electrical signal representative of a second quantum tunnelling current through the second quantum tunnelling barrier.

6. A method according to claim 1, wherein comparing an electrical signal representative of a quantum tunnelling current through the quantum tunnelling barrier with a reference electrical signal comprises comparing the electrical signal with a second electrical signal representative of a second quantum tunnelling current through a second quantum tunnelling barrier of a second electronic component of a second cell of the array.

7. A method according to claim 4, wherein the second electronic component comprises a transistor or a capacitor.

8. A method according to claim 1, wherein the method further comprises:
- producing an amplified voltage from the quantum tunnelling current; and
- wherein the electrical signal representative of the quantum tunnelling current comprises the amplified voltage.

9. A method according to claim 1, further comprising selecting the selection of the individually addressable cells and/or further comprising comparing the determined identifier value of the device with a known identifier, the known identifier corresponding to a selection of individually addressable cells of an array.

10. A method according to claim 1, further comprising providing the identifier value for the device for use in a communication protocol or a data transaction, optionally in encrypting or authenticating an aspect thereof, and/or providing the identifier value for the device as a digital identifier of a physical object or a digital object.

11. A method according to claim 1, wherein the device comprises an integrated circuit.

12. A non-transitory computer readable medium having instructions stored thereon which, when executed by a processor, cause the processor to implement a method according to claim 1.

13. A controller configured to determine an identifier of a remote device, the controller comprising:
- one or more processors configured to communicate with the remote device to cause the performance of a method according to claim 1.

14. A device comprising:
- an array of individually addressable cells, each cell comprising an electronic component having a quantum tunnelling barrier;
- processing circuitry configured to, for each cell of a selection of the individually addressable cells of the array:
  - apply a potential difference across the electronic component of the cell, the potential difference sufficient to enable tunnelling of charge carriers through the quantum tunnelling barrier;
  - compare an electrical signal representative of a quantum tunnelling current through the quantum tunnelling barrier with a reference electrical signal; and
  - determine, from the comparison, an identifier value for the cell; and
- wherein the processing circuitry is further configured to determine, from the identifier values of each cell of the selection of individually addressable cells, an identifier value for the device.

15. A device according to claim 14,
- wherein the electronic component having a quantum tunnelling barrier is a first electronic component having a first quantum tunnelling barrier;
- wherein each cell further comprises a second electronic component having a second quantum tunnelling barrier; and
- wherein the processing circuitry is further configured to, for each cell of the selection of the individually addressable cells, apply a potential difference across the second electronic component of the cell, the potential difference sufficient to enable tunnelling of charge carriers through the second quantum tunnelling barrier; and
- wherein comparing an electrical signal representative of a quantum tunnelling current through the quantum tunnelling barrier with a reference electrical signal comprises:
  - comparing a first electrical signal representative of a first quantum tunnelling current through the first quantum tunnelling barrier with a second electrical signal representative of a second quantum tunnelling current through the second quantum tunnelling barrier.

16. A device according to claim 14,
- wherein the array is a physically unclonable function, and/or
- wherein the processing circuitry includes a latched comparator configured to, for each cell of the selection of the individually addressable cells of the array, compare the electrical signal representative of the tunnelling current through the quantum tunnelling barrier with the reference electrical signal.

17. A device according to claim 14, wherein the processing circuitry includes a transimpedance amplifier configured to, for each cell of the selection of the individually addressable cells of the array, produce an amplified voltage from the quantum tunnelling current, wherein the electrical signal representative of the quantum tunnelling current comprises the amplified voltage, and, optionally, wherein the transimpedance amplifier is further configured to apply the potential difference across the electronic component of the cell.

18. A device according to claim 14, further comprising a communication interface, the communication interface configured to:
- receive a communication from a third party, the communication indicating the selection of the individually addressable cells of the array; and
- transmit a second communication indicating the identifier value of the device.

19. A device according to claim 14, wherein the processing circuitry further comprises one or more processors configured to:
- select the selection of individually addressable cells of the array;
- determine the identifier values for each cell of the selection of individually addressable cells of the array; and
- determine, from the identifiers of each cell of the selection of individually addressable cells, the identifier value for the device.

20. A non-transitory computer-readable storage medium configured to store challenges and responses pertaining to an array, the array comprising a plurality of individually addressable cells, each cell of the array comprising an electronic component having a quantum tunnelling barrier, the computer-readable storage medium comprising:
- first information interpretable as a selection of cells of the array; and
- second information interpretable as an identifier value of the array, the identifier value of the array associated with the selection of cells of the array and determinable from the selection of cells of the array by performing a method according to claim 1.

* * * * *